(12) United States Patent
Hansson et al.

(10) Patent No.: US 7,564,700 B2
(45) Date of Patent: Jul. 21, 2009

(54) POWER SUPPLY SYSTEM AND APPARATUS

(75) Inventors: Anders Hansson, Stockholm (SE);
Thomas Sahlstrom, Huddinge (SE);
Jun Ma, Farsta (SE); Mattias Andersson, Stockholm (SE)

(73) Assignee: Emerson Energy Systems, AB, Stockholm (SE)

( * ) Notice: Subject to any disclaimer, the term of this patent is extended or adjusted under 35 U.S.C. 154(b) by 0 days.

(21) Appl. No.: 12/056,784

(22) Filed: Mar. 27, 2008

(65) Prior Publication Data

US 2008/0174291 A1    Jul. 24, 2008

Related U.S. Application Data

(60) Division of application No. 11/470,521, filed on Sep. 6, 2006, now Pat. No. 7,408,790, which is a continuation of application No. 10/487,107, filed as application No. PCT/SE03/00700 on Apr. 29, 2003, now Pat. No. 7,193,864.

(30) Foreign Application Priority Data

| Apr. 29, 2002 | (SE) | ................................ 0201290 |
| May 13, 2002 | (SE) | ................................ 0201432 |

(51) Int. Cl.
*H02M 3/335* (2006.01)
(52) U.S. Cl. .................. 363/16; 363/98; 323/222; 323/269
(58) Field of Classification Search ......... 323/282–288, 323/269, 272, 222, 275; 363/17, 89, 98, 363/132, 127, 97, 134, 25, 39, 41
See application file for complete search history.

(56) References Cited

U.S. PATENT DOCUMENTS

| 4,467,406 A | 8/1984 | Hattori et al. |
| 4,794,506 A | 12/1988 | Hino et al. |

(Continued)

FOREIGN PATENT DOCUMENTS

EP    0255258 A2    2/1988

(Continued)

OTHER PUBLICATIONS

Digital control full brid, Sep. 1997, European, Ellis et al.*

(Continued)

*Primary Examiner*—Rajnikant B Patel
(74) *Attorney, Agent, or Firm*—Locke Lord Bissell & Liddell LLP

(57) ABSTRACT

The present invention relates to a switched mode power supply with programmable digital control and to a power supply system comprising a plurality of switched mode power supplies. The input terminals and the output terminals of the switched mode power supply system are separated by an insulation barrier, and the switched mode power supply comprises a conversion stage having at least one switching element. The switching element of the conversion stage, as well as any switching elements of a possible pre-regulator, is digitally controlled by a programmable digital circuit. In one embodiment of the switched mode power supply, the programmable digital circuit is located on the primary side of the insulation barrier.

22 Claims, 18 Drawing Sheets

U.S. PATENT DOCUMENTS

| | | | |
|---|---|---|---|
| 5,138,543 | A | 8/1992 | Harm et al. |
| 5,138,545 | A | 8/1992 | Godawski |
| 5,349,523 | A | 9/1994 | Inou et al. |
| 5,394,064 | A * | 2/1995 | Ranganath et al. ...... 315/209 R |
| 5,483,436 | A | 1/1996 | Brown et al. |
| 5,576,940 | A | 11/1996 | Steigerwald et al. |
| 5,654,880 | A | 8/1997 | Brkovic et al. |
| 5,870,294 | A | 2/1999 | Cyr |
| 6,005,377 | A | 12/1999 | Chen et al. |
| 6,115,266 | A | 9/2000 | Matsui et al. |
| 6,259,239 | B1 | 7/2001 | Liu |
| 6,333,624 | B1 | 12/2001 | Ball et al. |
| 6,803,746 | B2 * | 10/2004 | Aker et al. ................. 320/139 |
| 2001/0015900 | A1 | 8/2001 | Preller |
| 2002/0001204 | A1 | 1/2002 | Lentini et al. |

FOREIGN PATENT DOCUMENTS

| | | |
|---|---|---|
| JP | 09215320 A | 8/1997 |
| JP | 2000-014147 | 1/2000 |

OTHER PUBLICATIONS

Feng, Y-T., Tsai, G-L, and Tzou, Y-Y. "Digital control of a single-stage single-switch flyback PFC AC/DC converter with fast dynamic response." 2001 IEEE 32nd Annual Power Electronics Specialists Conference, 2001. PESC. Vancouver, BC, Canada, Jun. 17-21, 2001, vol. 2, pp. 1251-1256.

Feng, Y-T., Lai, C-H., Lin, S-Y., Chen, E. and Tzou, Y-Y. "DSP-based fully digital control of an on-line UPS." 2001 4th IEEE International Conference on Power Electronics and Drive Systems, 2001. Proceedings. Oct. 22, 2001, pp. 301-305, New Jersey.

Thoren, C. and Sahlstrom, T. "A New Improved Rectifier for Standard Telecom Systems." International Telecommunications Energy Special Conference, 1997. Proceedings. Apr. 22, 1997, pp. 143-150, Hungary.

Ellis, I., Forsyth, A.J. and Lu, Z. "A High-Performance Digital Phase-Shift Controller for the Zero-Voltage-Switched Fullbridge Converter." 7th European Conference on Power Electronics and Applications, 1997. Sep. 8-10, 1997, vol. 3, Conf. 7, pp. 3173-3178.

European Search Report for Corresponding European Patent Application No. 06115694.

European Search Report for Corresponding European Patent Application No. 06115681.

International Search Report for Corresponding International Patent Application No. PCT/SE03/00700.

* cited by examiner t

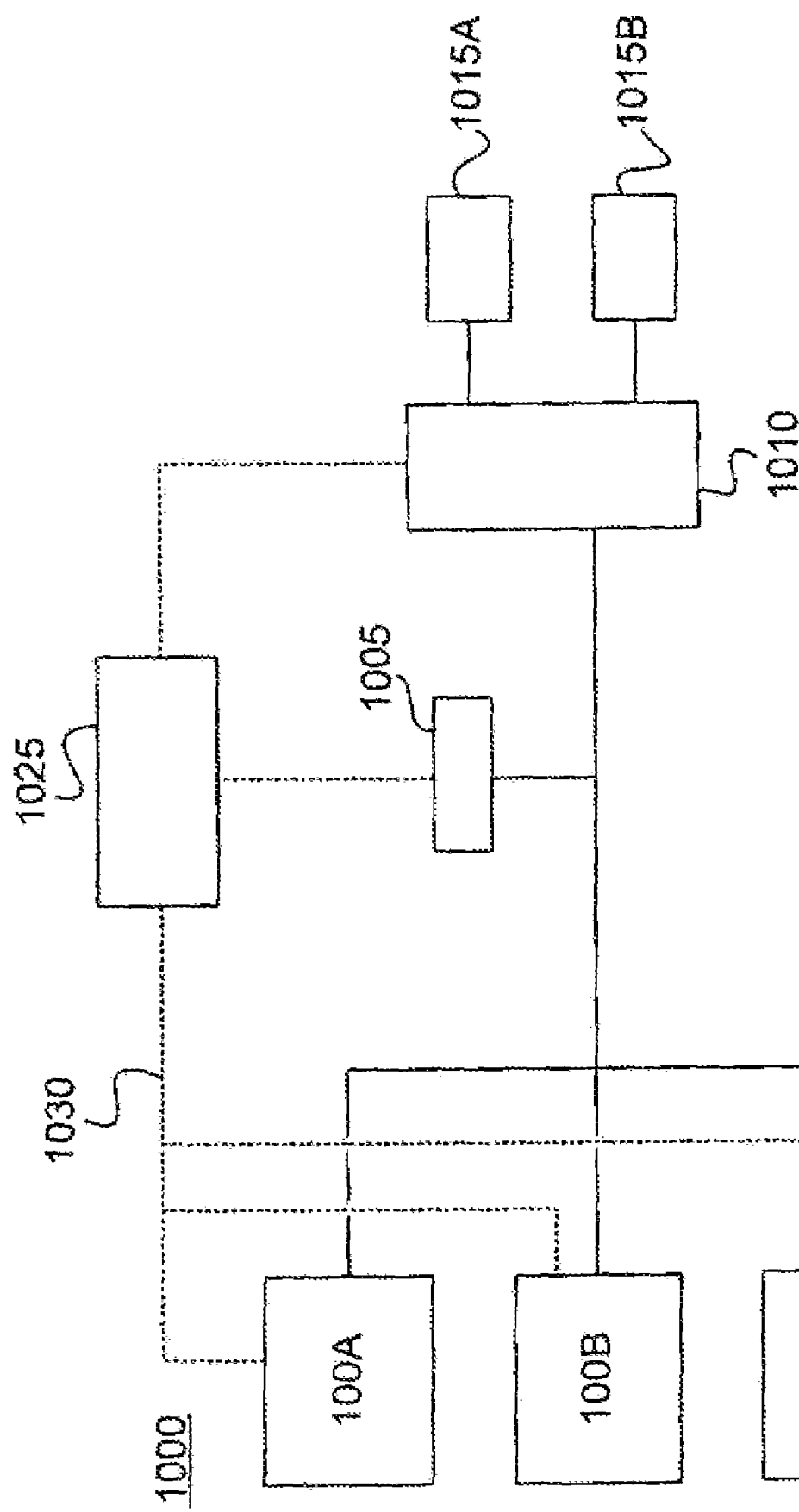

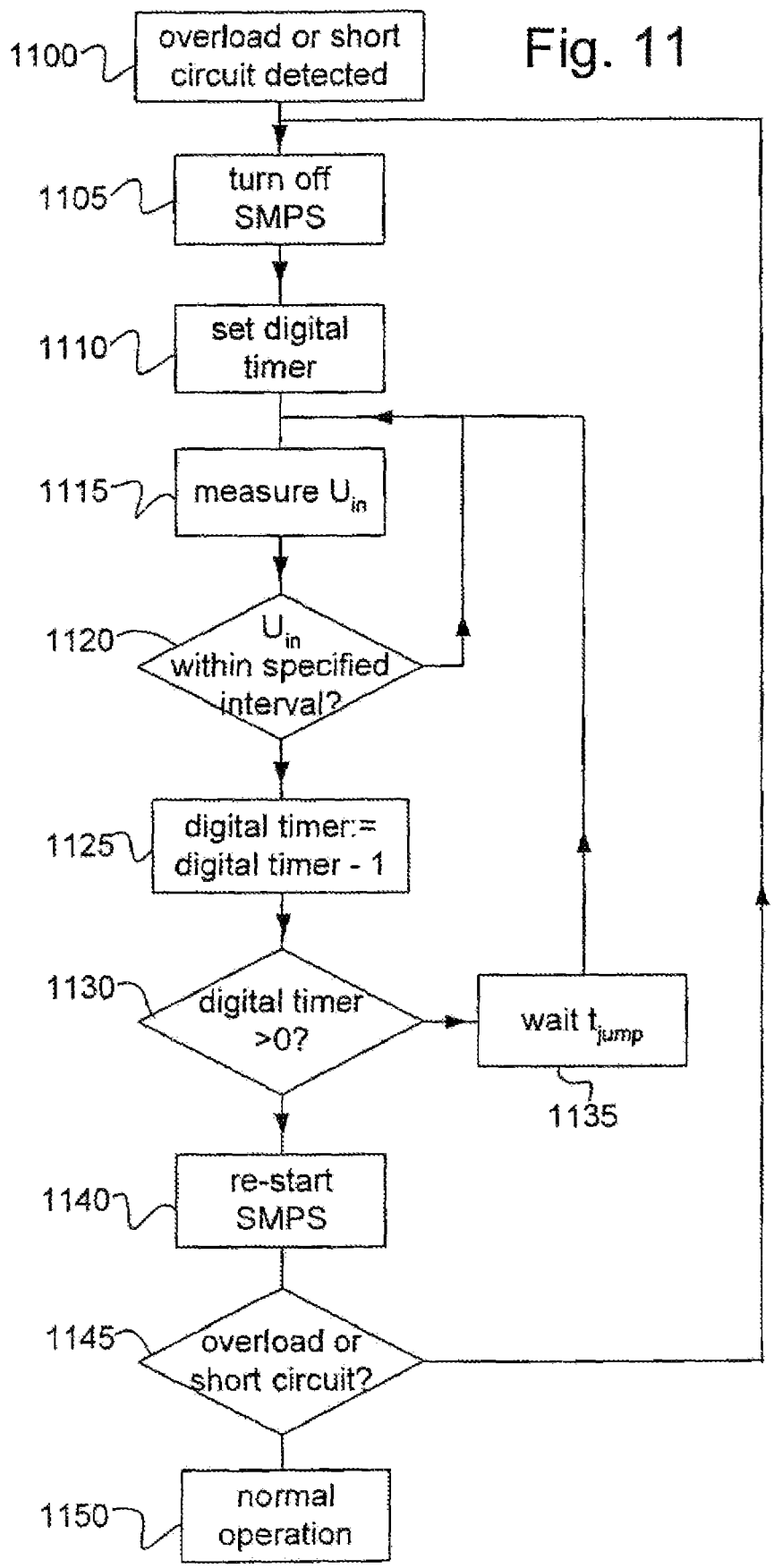

POWER SUPPLY SYSTEM AND APPARATUS

CROSS-REFERENCE TO RELATED APPLICATIONS

This application is a divisional application of U.S. patent application Ser. No. 11/470,521, filed on Sep. 6, 2006, which is a continuation of issued U.S. Pat. No. 7,193,864, filed on Feb. 17, 2004, which is a National Stage Entry of International Application No. PCT/SE03/00700 claiming priority to Swedish Application Nos. 0201290-4 and 0201432-2, filed Apr. 29, 2002 and May 13, 2002, respectively, all of which are incorporated by reference.

FIELD OF THE INVENTION

The present invention relates to the field of power supply in general, and more particularly to a switched mode power supply with programmable digital control.

BACKGROUND

In many areas of modern society, a reliable power supply is crucial for the correct functioning of electrical appliances. One such area is mobile radio telephony, where the users of mobile radio telephones expect the mobile radio network to function without disturbances. In such mobile radio networks, switched mode power supplies are used in order to convert the mains voltage into a steady DC voltage which can be provided to various loads, such as e.g. radio transceivers. In a switched mode power supply, transistors are switched on and off according to a variable duty cycle, in order to obtain the desired output characteristics of the power supply. Furthermore, a switched mode power supply is often further connected to a battery, in order to charge the battery so that the battery can take over the power supply should the mains voltage fail. An example of a switched mode power supply is described in *A new improved rectifier for standard telecom systems*, Telescon 97, Budapest Apr. 22-24, 1997.

SUMMARY

A problem to which the present invention relates is how to provide an improved switched mode power supply and an improved power supply system.

This problem is addressed by a switched mode power supply having input terminals for receiving electric power and output terminals for delivering an output signal having an output voltage and an output current;

wherein said input terminals are separated from said output terminals (135) by an insulation barrier (140) so that said input terminals (110) are provided on a primary side of the insulation barrier (140) and said output terminals (135) are provided on a secondary side of the insulation barrier (140); said switched mode power supply comprising a converter stage (125) coupled between the input terminals and the output terminals, said converter stage having at least one controllable first switching element (205) for generating a converter stage duty cycle (D) so as to cause said converter stage (125) to generate said output signal, and a programmable digital circuit (600) for controlling said first switching element (205) in dependence of at least one signal (Uin, Iin, Uint, Iint, Uac) obtained on said primary side of the insulation barrier (140), said programmable digital circuit being located on said primary side of said insulation barrier.

The provision of the programmable digital circuit on said primary side of said insulation barrier advantageously enables the programmable digital circuit to control said first switching element without any need to send the control signal over the insulation barrier. The elimination of the need to send the control signal over the insulation barrier makes it possible to achieve a more accurate control of the switching element, thereby obtaining a more accurately generated converter stage duty cycle. Since the transfer of the control signal over the insulation barrier is eliminated the risk for accidental cross-conduction by the switching elements (i.e. simultaneous conduction of two switching elements causing a temporary short-circuit) due to inaccurate control signals and unfortunate time delays is eliminated or reduced. Such cross-conduction may otherwise occur as a consequence of delays in pulse transformers for transferring control signals or random delays in optocouplers.

This invention also relates to a switched mode power supply (100) having input terminals (110) for receiving electric power and output terminals (135) for delivering an output signal having an output voltage and an output current;

wherein said input terminals (110) are separated from said output terminals (135) by a insulation barrier (140) so that said input terminals (110) are provided on a primary side of the insulation barrier (140) and said output terminals (135) are provided on a secondary side of the insulation barrier (140); said switched mode power supply comprising a converter stage (125) coupled between the input terminals and the output terminals, said converter stage having at least one controllable first switching element (205) for generating a converter stage duty cycle (D) so as to cause said converter stage (125) to generate said output signal, and a programmable digital circuit (600) for controlling said switching element (205) in dependence of at least one signal.

In an embodiment of the switched mode power supply said programmable digital circuit is located on the primary side of said insulation barrier.

In an embodiment of the switched mode power supply the converter stage can operate in a mode ($M_{2-3}$) for delivering a substantially constant output power; and the converter stage can operate in a mode ($M_{3-5}$) for delivering a substantially constant output current.

In an embodiment of the switched mode power supply said programmable digital circuit comprises means for receiving a signal (725) representing the input current of the converter stage ($I_{int}$);

said programmable digital circuit is adapted to deriving the output current ($I_{out}$) from said signal representing the input current of the converter stage ($I_{int}$); and said programmable digital circuit is further adapted to using said derived value ($I_{out}^{est}$) of the output current ($I_{out}$) in the control of the first switching element.

This solution advantageously makes it possible to control the switched mode power supply so that the switched mode power supply delivers a constant output power or a constant output current on the secondary side, while the control is based on signals obtained only on the primary side of the isolation barrier. Hence, the output current can be controlled without measuring the actual output current.

The above mentioned problem is also addressed by a power supply system comprising at least a first switched mode power supply and a second switched mode power supply connected in parallel to a distribution unit. The first switched mode power supply has first input terminals and first output terminals, wherein said first input terminals and first output terminals are separated by a first insulation barrier. The first switched mode power supply comprises a first converter stage connected between the first input terminals and the first output terminals and the first converter stage has at least one first switching element. The first switched mode power supply further comprises a first programmable digital circuit adapted to controlling said first switching element. The second switched mode power supply has second input terminals and second output terminals, wherein said second input terminals and second output terminals are separated by a second insulation barrier. The second switched mode power supply comprises a second converter stage connected between the second input terminals and the second output terminals and the second converter stage has at least one second switching element. The second switched mode power supply further comprises a second programmable digital circuit adapted to controlling said second switching element.

By said switched mode power supply and power supply system is achieved an increased reliability, increased flexibility and reduced manufacturing costs of switched mode power supplies and power supply systems.

In one embodiment of the power supply system, the first programmable digital circuit is adapted to using the mains frequency in determining timing of re-start attempts of the first switched mode power supply, and the second programmable digital circuit is adapted to using the mains frequency in determining timing of re-start attempts of the second switched mode power supply. Hereby is achieved accurate synchronisation of re-start attempts of the first and second switched mode power supply, and the risk of re-start failure due to un-synchronised re-starts of the first and second switched mode power supplies is minimised.

In one aspect of the inventive switched mode power supply, the switched mode power supply comprises a pre-regulator comprising at least a second switching element, and the programmable digital circuit is further adapted to controlling said second switching element. Hereby is achieved that the shape and the phase of the input current can be regulated by means of the programmable digital circuit.

In one embodiment of the inventive switched mode power supply, the programmable digital circuit is located on the primary side of said insulation barrier. Hereby is achieved that the number of signals that have to be transmitted across the insulating barrier is minimised, and that the disturbances of the system are minimised. In one aspect of this embodiment, the programmable digital circuit comprises means for receiving a value representing the input current of the converter stage ($I_{int}$). The programmable digital circuit is adapted to deriving the output current ($I_{out}$) from said input current of the converter stage, and the programmable digital circuit is further adapted to using said derived value of the output current in the control of the first switching element. Hereby is achieved that the output current does not have to be measured and no signal representing the output current has to be transmitted across the insulation barrier.

In one embodiment of the switched mode power supply, the switched mode power supply comprises means for measuring a quantity, means for generating a reference value of said quantity and means for generating the difference between the measured value and the reference value of said quantity. In this embodiment of the invention, the programmable digital circuit comprises means for converting said difference between the measured value and the reference value of said quantity into digital representation. Hereby is achieved that the means for converting into digital representation can use a modest number of bits for the digital representation. In one aspect of this embodiment, said quantity is the output voltage of the switched mode power supply, and the programmable digital circuit is further adapted to using said difference in the control of the first switching element. Hereby is achieved that a precise regulation of the output voltage can be obtained by means of the programmable digital circuit.

In one embodiment of the switched mode power supply, the converter stage comprises four switching elements arranged in a fullbridge. In this embodiment, the programmable digital circuit is adapted to control said four switching elements. Hereby is achieved that the converter stage can operate with high efficiency. In one aspect of this embodiment, the programmable digital circuit is adapted to generating and sending one pulse width modulated signal to each of said four switching elements. The programmable digital circuit is further adapted to determining a phase shift in two of said four pulse width modulated signals with respect to the other two of the four pulse width modulated signals, said phase shifts being determined based on a desired value of the duty cycle of said converter stage. Hereby is achieved that the control of the fullbridge can be obtained by means of said programmable digital circuit.

BRIEF DESCRIPTION OF THE DRAWINGS

FIG. 11 is a schematic flowchart illustrating how the timing of a re-start of a switched mode power supply can be determined by use of the mains frequency.

DETAILED DESCRIPTION

Figure 1:
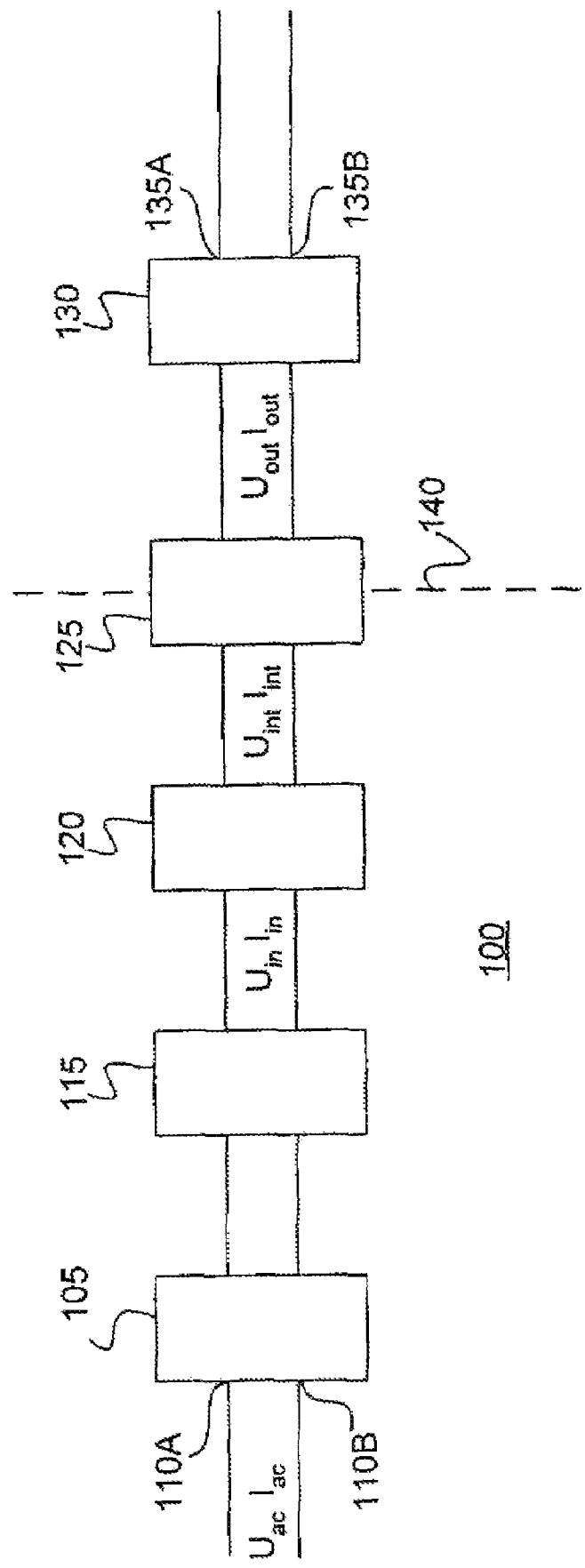
FIG. 1 is a schematic drawing of a rectifying switched mode power supply comprising two regulation stages.

A Switched Mode Power Supply (SMPS) 100 is schematically shown in FIG. 1. The SMPS shown in FIG. 1 is a rectifier which comprises an input filter 105 comprising input terminals 110A and 10B, to which the mains voltage, $U_{ac}$, can be connected. The output of filter 105 is connected to the input of a diode bridge 115, by which an applied mains voltage, $U_{ac}$, is rectified. The output side of diode bridge 115 is connected to the input of a pre-regulator 120, the output of the pre-regulator 120 being connected to the input of a converter stage 125 and the output of the converter stage 125 being connected to an output filter 130. The SMPS 100 may be connected to a load via output terminals 135A and 135B of output filter 130. When a mains voltage, $U_{ac}$, is applied to the SMPS 100, a rectified voltage, $U_{in}$, referred to as the input voltage, is generated at the output of the diode bridge 115. An intermediate voltage, $U_{int}$, is generated at the output of the pre-regulator 120. The voltage at the output of converter stage 125 is referred to as the output voltage, $U_{out}$. The output filter 130 is for filtering the output voltage, while the input filter 105 is mainly for protecting the mains network from disturbances that SMPS 100 could possibly give rise to.

When a load is applied to SMPS 100, an input current, $I_{in}$, flows into pre-regulator 120. The output current of pre-regulator 120 is referred to as intermediate current, $I_{int}$, which is the input current to converter stage 125. The output current of converter stage 125 is referred to as the output current, $I_{out}$. As seen in FIG. 1, SMPS 100 is a rectifier that comprises two regulating stages, i.e. pre-regulator 120 and converter stage 125, and can therefore be referred to as a two stage rectifier.

SMPS 100 of FIG. 1 furthermore comprises an insulation barrier 140, which electrically insulates the input terminals 110 of SMPS 100 from the output terminals 135 of SMPS 100. This insulation barrier 140 is mainly introduced for safety reasons, but it also provides a possibility to choose the potential at which a load is being connected. In FIG. 1, the insulation barrier 140 is shown to be located within the converter stage 125. The part of SMPS 100 located to the left of insulating barrier 140 in FIG. 1 will hereinafter be referred to as being located on the primary side of the insulating barrier 140, while the part of the SMPS 100 located to the right of insulating barrier will be referred to as being located on the secondary side of insulating barrier 140.

Figure 2:
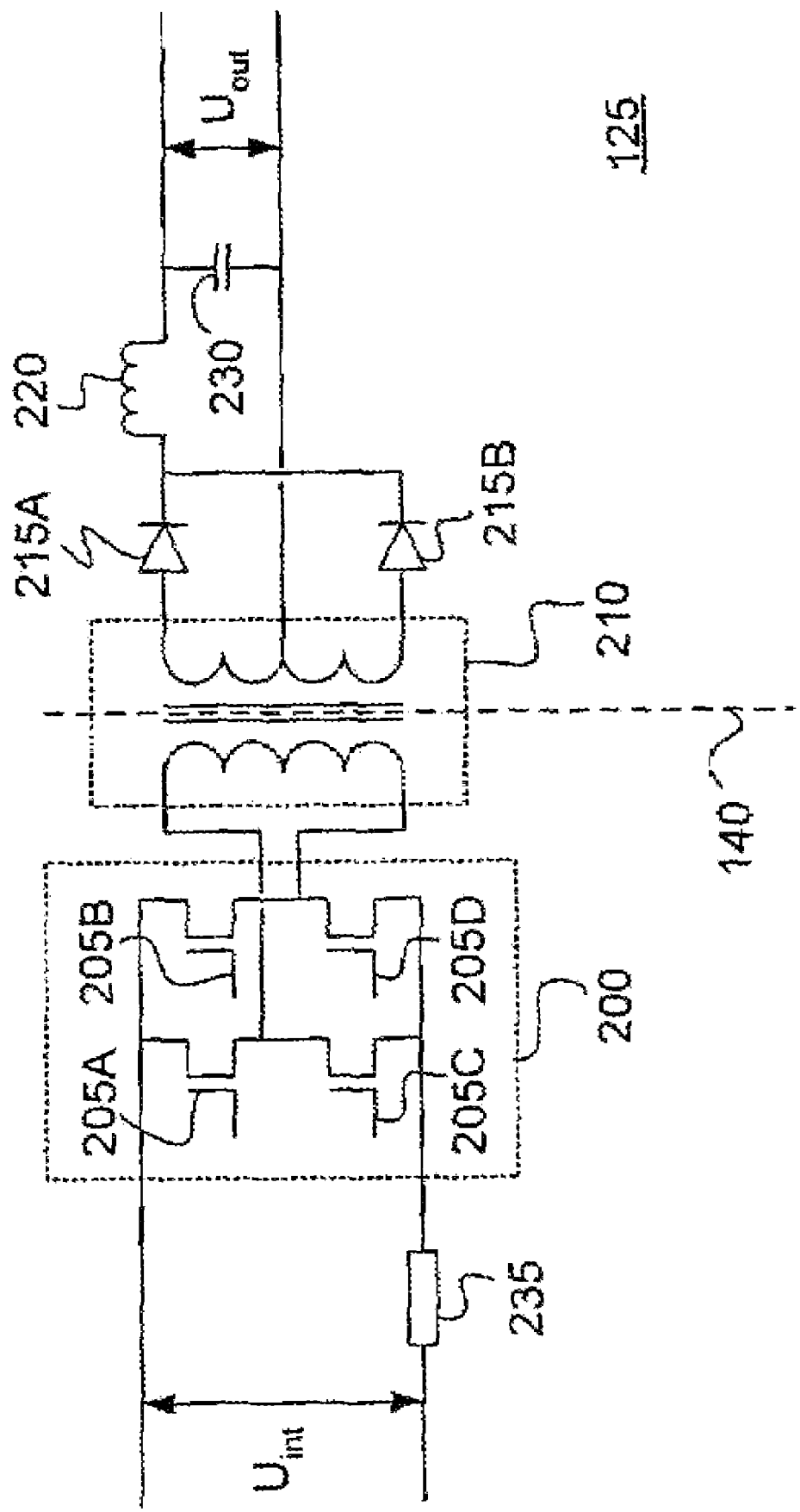
FIG. 2 is an example of a converter stage comprising a fullbridge.

The converter stage 125 comprises at least one switching element, by which the output characteristics of the SMPS 100 is controlled. An example of a converter stage 125 is shown in FIG. 2. The converter stage of FIG. 2 is a DC/DC converter 125 which comprises a fullbridge 200, having four switching elements 205A-D. The output of the fullbridge 200 is connected to the primary side of a transformer 210. Transformer 210 provides to SMPS 100, inter alia, the insulation barrier 140. Hence, the insulation barrier 140 comprises a transformer 210 having a primary winding and a secondary winding, said transformer using electromagnetic induction to transfer electrical energy from the primary winding to the secondary winding without direct electrical contact between the primary winding and the secondary winding.

On the secondary side of transformer 210, a rectifying element 215 is connected to each lead of the transformer winding. The outputs of rectifying elements 215 are connected to an inductor 220. A capacitor 230 is connected in parallel to the output of converter stage 125. Converter stage 125 could advantageously further comprise circuitry for driving the switching elements 205, not shown in the FIG. 2.

Figure 3:
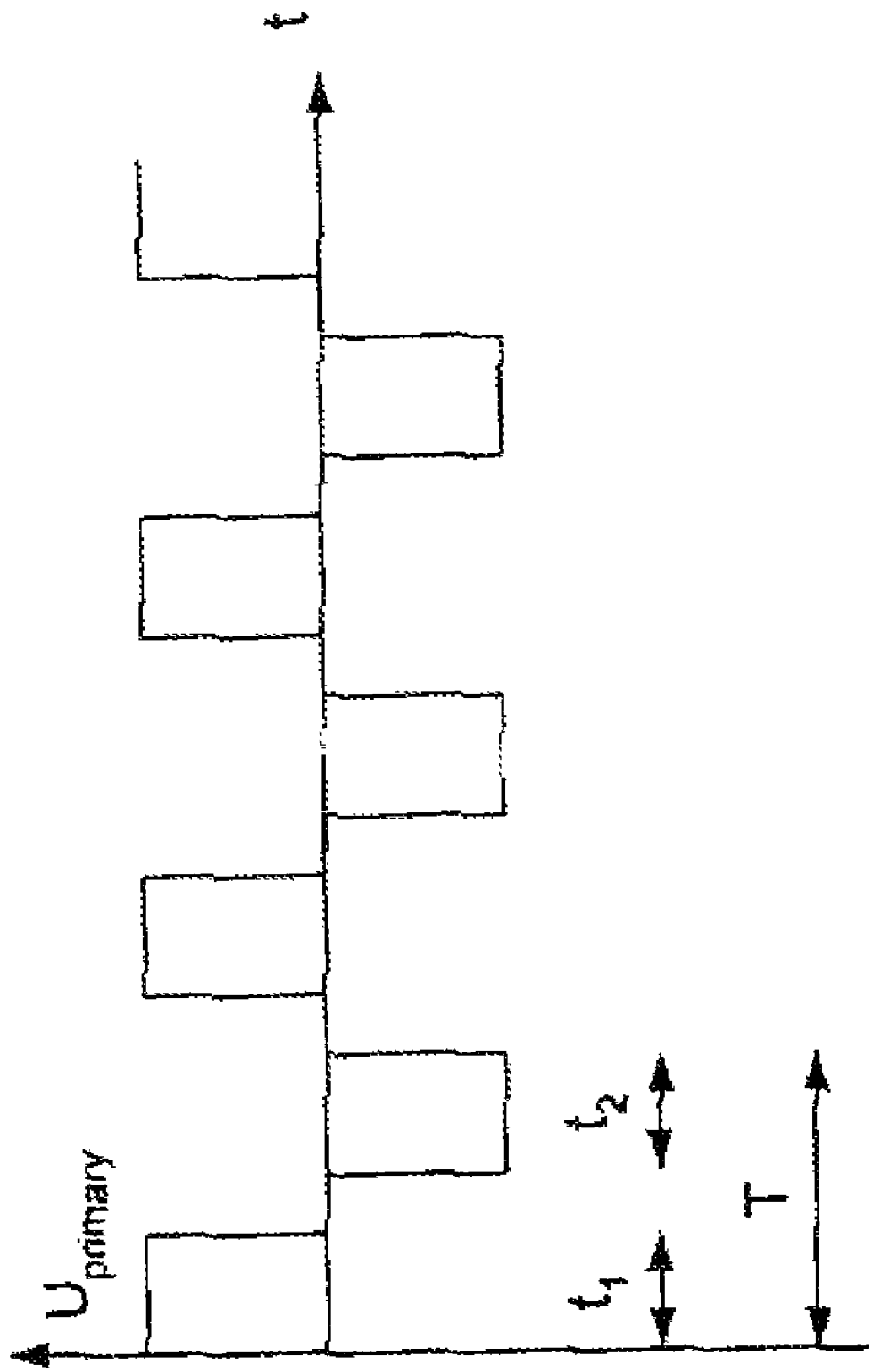
FIG. 3 is an illustration of the output voltage of the fullbridge of the converter stage shown in FIG. 2.

The switching of the switching elements 205A-D of converter stage 125 of FIG. 2 can be controlled so that the converter stage duty cycle, D, can be controlled. In FIG. 3, the voltage at the primary side of transformer 210, $U_{primary}$, is illustrated as a function of time, t. The converter stage duty cycle, D, is defined as:

$$D = \frac{t_1 + t_2}{T},$$

where T is the period of the voltage at the primary side of the transformer 210, $U_{primary}$, and $t_1$ and $t_2$ are the times during which the setting of the switching elements of fullbridge 200 yield a non-zero $U_{primary}$ during the positive and the negative halves of a period T, respectively. The converter stage duty cycle D can be varied by means of varying the switching of the switching elements 205, so that a desired output signal is generated at the output of SMPS 100.

In converter stage 125 of FIG. 2, the fullbridge 200 could be replaced by a single switching element 205, by two switching elements 205, or by any other number of switching elements 205 by which a controllable converter stage duty cycle, D, could be generated.

In the SMPS 100 of FIG. 1, the pre-regulator 120 could be omitted, and a rectification of the mains voltage, $U_{ac}$, would still be obtained. However, in many applications of SMPSs 100, it is important that the shape and the phase of the input current, $I_{in}$, can be controlled, and such control of input current, $I_{in}$, can preferably be performed by means of a pre-regulator 120. For example, in high power applications, it is important that the input current, $I_{in}$, and the input voltage, $U_{in}$, are of similar phase, since a phaseshift between the input current, $I_{in}$, and the input voltage, $U_{in}$, causes power dissipation, and such dissipation would cause considerable losses if the power provided by the SMPS 100 is high. By controlling the shape of the input current, $I_{in}$, overtone signals can be minimised. Such overtone signals would cause dissipation and could moreover disturb other users of the mains network. Besides controlling the input current, a pre-regulator 120 can provide a boost of the input voltage $U_{in}$, so that $U_{int} > U_{in}$. Furthermore, a pre-regulator can provide a constant intermediate voltage, $U_{int}$, which is used as the input current to the converter stage 125. A constant intermediate current facilitates the dimensioning of an efficient converter stage 125.

Figure 4:
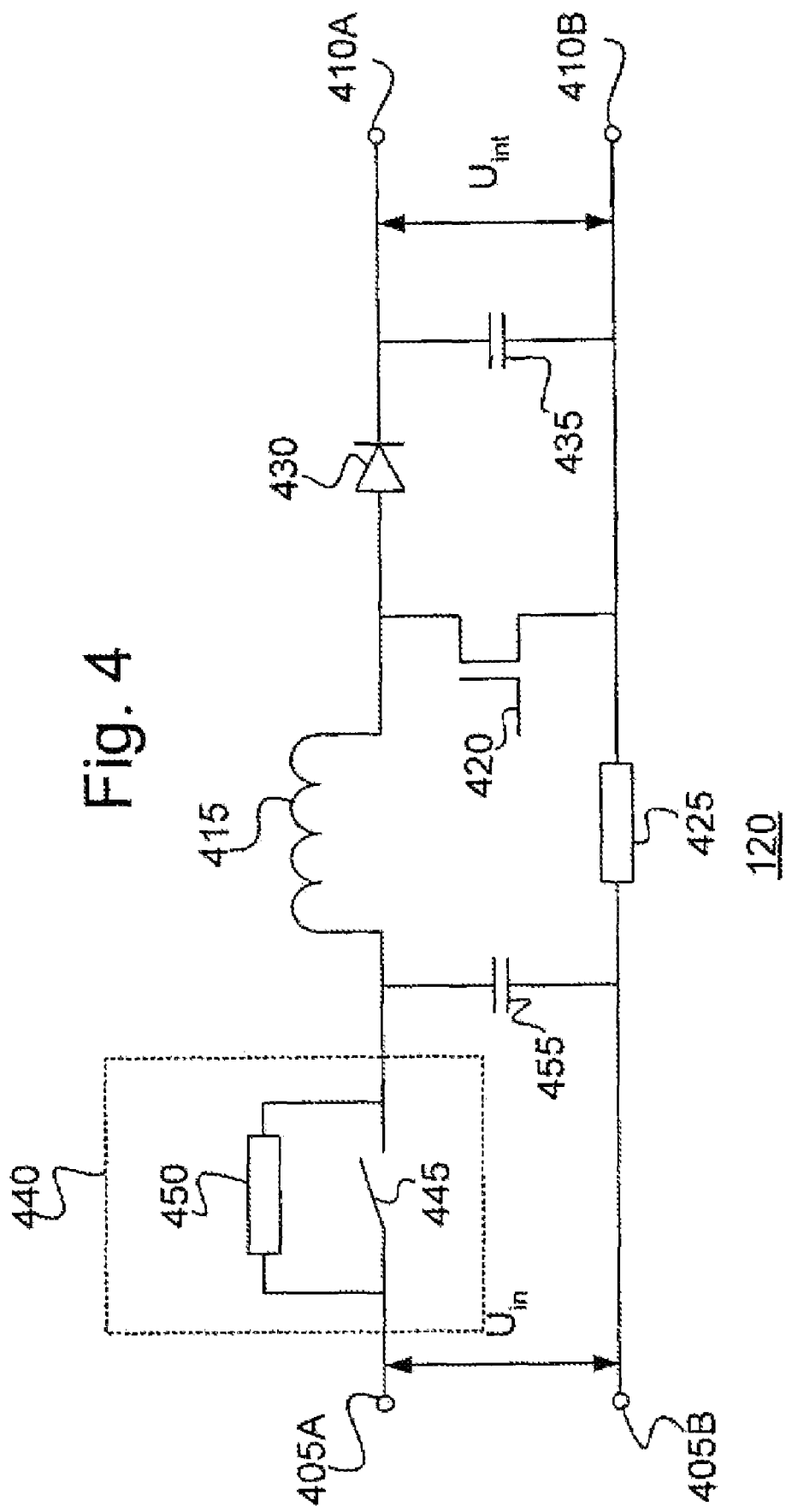
FIG. 4 is an example of a pre-regulator.

An example of pre-regulator 120 is shown in FIG. 4. The pre-regulator 120 of FIG. 4 is a boost pre-regulator with power factor correction, which provides as an output a constant DC intermediate voltage, $U_{int}$. The objective of power factor correction is to make the input of SMPS 100 display a purely resistive behaviour. Pre-regulator 120 of FIG. 4 has two input terminals 405A and 405B, respectively, as well as two output terminals 410A and 410B. An inductor 415 is connected to input terminal 405A. On the other side of inductor 415 is connected a switching element 420, which is further connected to input terminal 405B. Between input terminal 405B and switching element 420, a resistor 425 may be introduced, which can be used for measurement of input current, $I_{in}$. In parallel to switching element 420 is connected a series connection of a rectifying element 430 and a capacitor 435. The output voltage of pre-regulator 120, i.e. the intermediate voltage, $U_{int}$, is the voltage across capacitor 435. The capacitor 435 stores energy when the input voltage, $U_{in}$, is high and releases the energy when the input voltage is low, to maintain constant output power. By varying the on and off time of switching element 420, the input current, $I_{in}$, can be controlled. Furthermore, a constant intermediate voltage, $U_{int}$, can be obtained. The configuration of pre-regulator 120 of FIG. 4 could be varied in several ways. For example, a circuit 440 comprising a switch 445 and a resistor 450, connected in parallel, can advantageously be connected to input terminal 405A. Circuit 440 could be used to limit the input current, $I_{in}$, when the SMPS 100 is connected to the mains voltage, $U_{ac}$. Furthermore, a capacitor 455 could be connected between the input terminals 405A and 405B, the capacitor 455 protecting the mains network from ripple voltages generated by the switching of switching element 420

Figure 5:
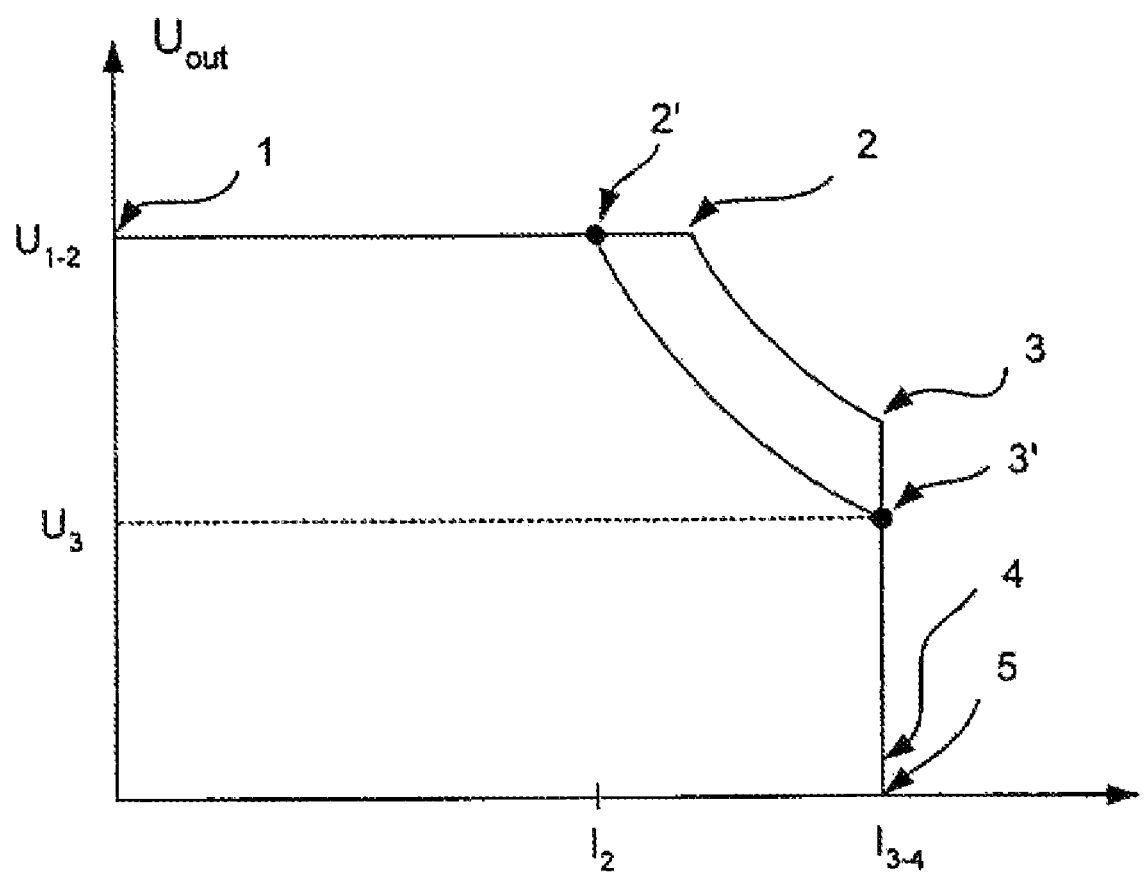
FIG. 5 is an example of an I-U-characteristic of a switched mode power supply.

In FIG. 5, an example of desired characteristics of SMPS 100 is shown in a I-U-diagram. At the point in the diagram indicated by number 1, no load is applied to SMPS 100, and hence there is no output current, $I_{out}$. The output voltage, $U_{out}$, at this point is at the nominal voltage, $U_{nom}$. An often used value of the nominal voltage is 48 V, although the nominal voltage could, depending on application, take any value. As the load is increased, the output current, $I_{out}$, increases, while the output voltage, $U_{out}$, is kept constant at the nominal voltage, $U_{nom}$. In the load range between the points in the diagram indicated by number 1 and number 2, the SMPS 100 is controlled according to constant voltage regulation. The point indicated by number 2 represents the current, at nominal voltage, where the output power of SMPS 100 has reached its maximum value. Between the points in the diagram indicated by number 2 and number 3, the output power of SMPS 100 is kept constant, and the SMPS 100 is controlled according to constant power regulation. The point in FIG. 5 indicated by number 3 represents the value of ($I_{out}$, $U_{out}$) where the output current has reached its maximum value. This limit is often set by the maximum current that can flow through the components of SMPS 100, or by the value of the output voltage where any connected batteries start to draw current. Between the points in the diagram indicated by number 3 and number 5, the SMPS 100 is controlled according to constant current regulation.

In alternative embodiments, the I-U-characteristics according to which the SMPS 100 is regulated could take other shapes than the I-U-characteristics presented in FIG. 5. For example, the constant power range between the points indicated by number 2 and 3 of FIG. 3, could be omitted. However, by implementing overload protection by means of both a constant power part and a constant current part of the I-U-characteristics, the input filter 105, diode bridge 115 and pre-regulator 120 can be made smaller, since they do not have to be designed for peak power at simultaneous nominal output voltage and maximum output current. This is especially relevant for SMPSs 100 which are designed for operation within a large span of the mains voltage, $U_{ac}$, since a low mains voltage, $U_{ac}$, yields restrictions on the maximum power that the SMPS 100 can deliver.

As mentioned above, the nominal output voltage of SMPS 100 could typically take a value of 48 V. The intermediate voltage, $U_{int}$, could then typically take a value of 400V. The output current, $I_{out}$, could in a typical SMPS 100 be set to 25 A. The switching frequencies of switching elements 420 and 205 could e.g. be approximately 100 kHz. These values of $U_{nom}$, $I_{out}^{max}$, and the switching frequencies are given as examples only. Obviously, these quantities could take any value required by the application of the SMPS 100.

In order to control the current, voltage and power of the output signal of SMPS 100 according to the desired I-U-characteristics, the switching of the switching elements 205 and 420 of converter stage 125 and pre-regulator 120, respectively, are controlled. The magnitude of a number of quantities have to be known in order to provide efficient control of the switching elements of converter stage 125 and pre-regulator 120. These quantities are preferably the input voltage, $U_{in}$, the input current, $I_{in}$, the intermediate voltage, $U_{int}$, the intermediate current, $I_{int}$, the output voltage, $U_{out}$ and the output current $I_{out}$.

Traditionally, the control of the switching elements 205 and 420 of converter stage 125 and pre-regulator 120, respectively, is performed by means of analogue circuits. However, analogue circuits tend to be expensive and space consuming. The reliability of the analogue circuits decrease as the number of components in the circuits increase and is furthermore affected by time, since components may age. Furthermore, the reliability of the analogue components may vary as parameters of the environment, such as temperature, varies. It would therefore be desirable to replace the analogue circuits by programmable digital control.

Introducing programmable digital control to the SMPS 100 further introduces flexibility in adjusting parameters, such as the maximum temperature at which the SMPS 100 should operate normally, the nominal output voltage, the level of the maximum power that the SMPS could deliver etc. Furthermore, calibration of the SMPS 100 at manufacturing could be performed without potentiometers, yielding great monetary savings regarding the amount of labour put into the calibration work. Moreover, less precise (and therefore cheaper) components can be used in SMPS 100, still obtaining an accurate SMPS 100 by adjusting parameters at calibration.

In embodiments of the SMPS 100 to which a region of constant power is included in the desired I-U-characteristics, a measurement of the mains voltage, $U_{ac}$, could advantageously be provided to the programmable digital circuit which provides programmable digital control to SMPS 100. Based on this measurement, the level of the maximum power that should be provided by SMPS 100 could be calculated by the programmable digital circuit.

When introducing programmable digital control to the SMPS 100, special care has to be taken in not breaking the insulating barrier 140. As is illustrated in FIGS. 1, 2 and 4, the switching elements of pre-regulator 120 and converter stage 125 are located on the primary side of the insulating barrier 140. Therefore, signals for controlling the operation of these switching elements have to be provided on the primary side of the insulating barrier 140. Furthermore, the input current and voltage, $I_{in}$ and $U_{in}$, as well as the intermediate current and voltage, $I_{int}$ and $U_{int}$, are given on the primary side of the insulation barrier 140. Moreover, in order to enable the SMPS 100 to start up, the programmable digital control has to be fed by a supply voltage at the primary side of insulation barrier 140. In embodiments including means for providing the programmable digital circuit with a measurement of the mains voltage, $U_{ac}$, this measurement is obviously generated at the primary side of the insulation barrier 140. However, some of the quantities of which the knowledge of the magnitude is desirable, such as the output voltage, $U_{out}$, and the output current, $I_{out}$, are given on the secondary side of the insulation barrier 140. Therefore, means for transmitting signals across the insulating barrier 140, or alternative solutions, have to be provided.

The programmable digital circuit which provides programmable digital control to SMPS 100 could be located on the primary side of the insulating barrier 140, or on the secondary side. By locating the programmable digital circuit on the primary side, the number of signals that need to be transmitted across the insulating barrier 140 is minimised. Since transmitting signals across the insulating barrier 140 requires extra components, the cost of SMPS 100 increases with the number of signals that have to be transmitted across the insulating barrier 140. Furthermore, the distance across which the analogue signals representing measured quantities such as $I_{in}$ and $U_{in}$ has to be transmitted is minimised by locating the programmable digital control on the primary side of insulating barrier 140, thus minimising disturbances in these signals. However, when locating a programmable digital circuit on the primary side of the insulating barrier 140, special care has to be taken to avoid disturbances in the programmable digital circuit caused by the switching of the switching elements of pre-regulator 120 and converter stage 125. Such disturbances, as well as disturbances of the mains voltage, $U_{ac}$, can be avoided by careful design of the SMPS 100, so that power currents, digital signals and analogue signals are physically separated.

Figure 6:
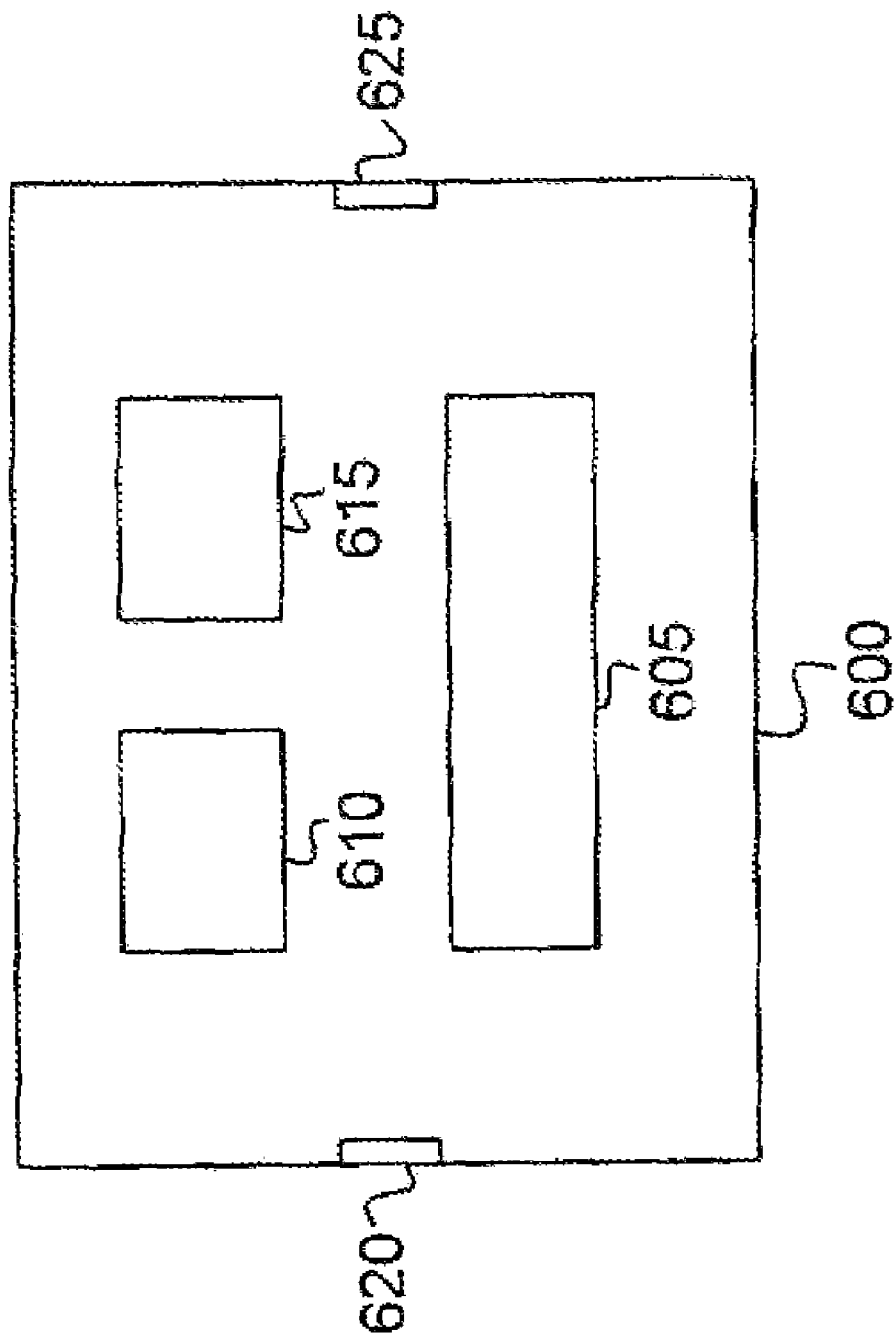
FIG. 6 is an example of a programmable digital circuit to be used for the control of a switched mode power supply.

An example of a programmable digital circuit 600 to be used for the control of SMPS 1100 is schematically illustrated in FIG. 6. Programmable digital circuit 600 comprises processing means 605, a working memory 610, and an at least partly non-volatile memory 615 for storing executable commands. Programmable digital circuit 600 further comprises an analogue input 620 having an A/D converter, and a digital output 625. Obviously, a programmable digital circuit 600 could have any number of analogue inputs 620, digital inputs and digital outputs 625.

Figure 7:
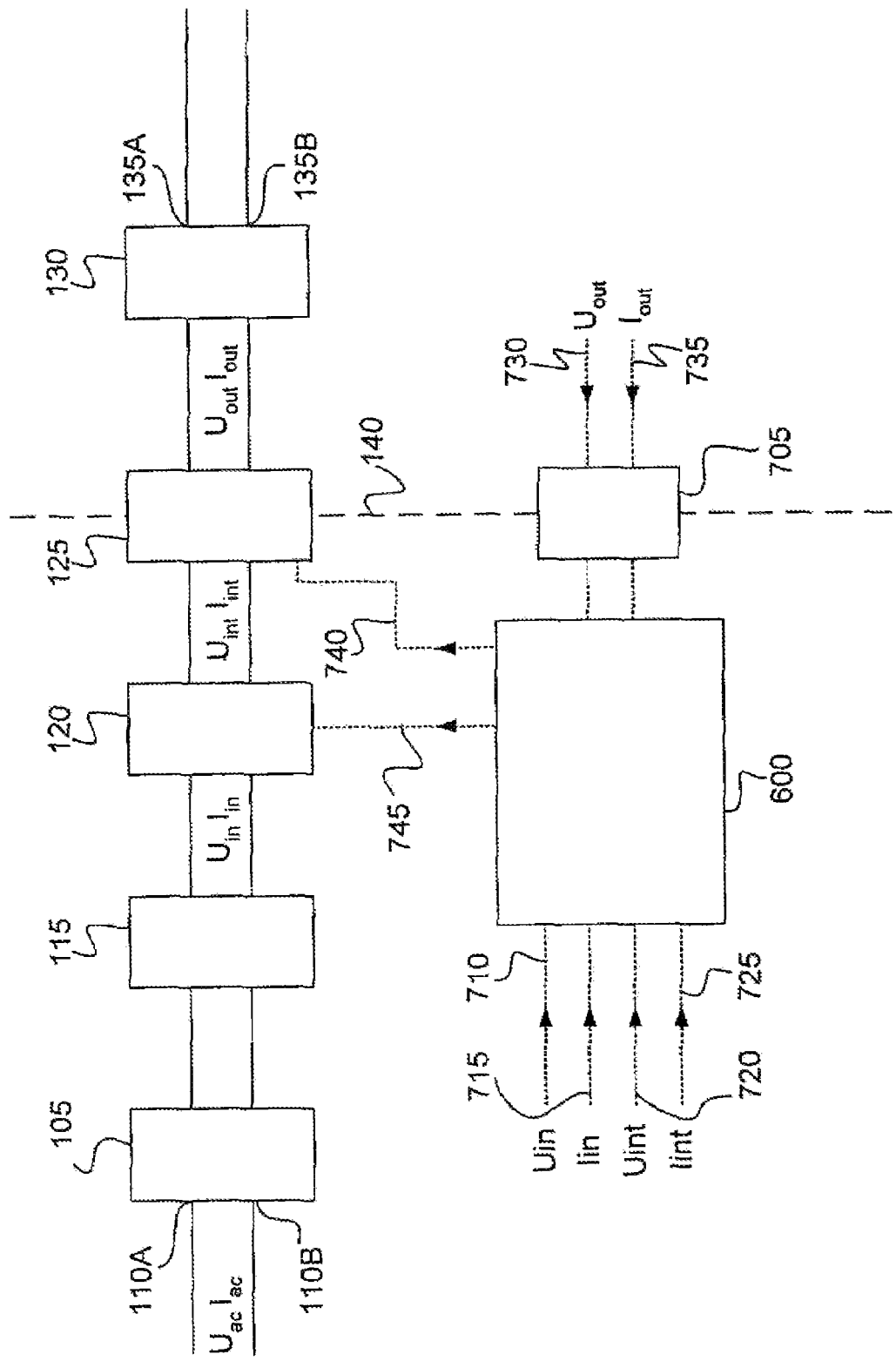
FIG. 7 is a schematic drawing of a switched mode power supply comprising digital control.

An embodiment of the inventive SMPS 100 is schematically illustrated in FIG. 7, in which a programmable digital circuit 600 has been introduced on the primary side of the insulation barrier 140 for the control of the switching elements 420 and 205 of pre-regulator 120 and converter stage 125, respectively. The magnitudes of the input voltage, $U_{in}$, the input current, $I_{in}$, the intermediate voltage, $U_{int}$, and the intermediate current, $I_{int}$, are measured and provided to programmable digital circuit 600 in a conventional manner. The output voltage, $U_{out}$, and the output current, $I_{out}$, are measured on the secondary side of the insulation barrier 140, and are therefore provided to digital programmable circuit 600 by means of an insulating interface 705. The signals corresponding to $U_{in}$, $I_{in}$, $U_{int}$, $I_{int}$, $U_{out}$ and $I_{out}$ are indicated in FIG. 7 by reference numerals 710, 715, 720, 725, 730 and 735, respectively.

Based on the magnitudes of $U_{in}$, $I_{in}$, $U_{int}$, $I_{int}$, $U_{out}$ and $I_{out}$, programmable digital circuit 600 determines, by use of executable commands stored in memory 610, a duty cycle, D, of converter stage 125. Programmable digital circuit 600 then sends a signal 740, indicating the on and off time of the switching element(s) 205, to converter stage 125. In an embodiment of the invention where converter stage 125 comprises more than one switching element 205, e.g. a fullbridge 200, signal 740 preferably comprises a plurality of signals 740, each signal 740 indicating the on and off time of one of the switching elements 205. In a similar manner, programmable digital circuit 600 determines a desired on and off time of switching element 420 based on the magnitudes of $U_{in}$, $I_{in}$ and $U_{int}$. Programmable digital circuit 600 then sends a signal 745 to pre-regulator 120, signal 745 indicating the desired on and off time of switching element 420. In embodiments where pre-regulator 120 comprises more than one switching element, signal 745 could preferably comprise a plurality of signals, one signal for each switching element of pre-regulator 120.

Insulating interface 705 could advantageously comprise a linear optocoupler for each signal that is to be transmitted across insulating barrier 140. An optocoupler is a comparatively small and cheap device which, with maintained accuracy, can be used both for the transmission of pulse shaped signals, such as the pulse width modulated control signals 740 and 745, and for the transmission of analogue signals, such as the signals 710-735. An optocoupler comprises, inter alia, a light emitting diode on the side of the insulating barrier from which a signal is to be transmitted, and a photo-receiver on the side of the insulating barrier 140 at which the signal is to be received. When a signal is to be transmitted across the insulating barrier 140, the light emitted from the light emitting diode is controlled so that it induces a current in the photo-diode that is proportional to the signal that is to be transmitted. As an alternative to using optocouplers, other means for transmission of signals across the insulation barrier 140 could be used, such as e.g. pulse transformers. However, pulse transformers are primarily suited for the transmission of pulse shaped signals and are less appropriate for the transmission of analogue signals.

In one aspect of the invention, the output current, $I_{out}$, is not measured, but is instead derived, in programmable digital circuit 600 by means of executable commands stored in memory 610, from the measured value of the intermediate current, $I_{int}$. In this way, the number of signals that have to be transferred across the insulating barrier 140 is reduced, thus making the design of SMPS 100 simpler, and therefore cheaper, smaller and more reliable. Furthermore, measuring and transferring signals across the insulating barrier 140 may give rise to undesired losses. By not having to measure the signal corresponding to the output current, $I_{out}$, these losses can be reduced.

Transformer theory gives the relation between the primary side current, i.e. the intermediate current, $I_{int}$, of SMPS 100, and the secondary side current, i.e. the output current, $I_{out}$, of SMPS 100, as:

$$I_{out} = \frac{I_{int}N_P}{DN_s}, \quad (1)$$

where $N_p$ and $N_s$ are the number of turns of the primary and secondary side of the transformer, respectively, and D is the duty cycle of the converter stage 125, which is known (and furthermore controlled) by the programmable digital circuit 600.

Eq. (1) is valid for an ideal SMPS, that does not experience any power losses and other practical limitations. Measurements show, however, that compensation can be made for such non-ideal behaviour of SMPS 100, in the voltage and current range of normal operation, by introducing a correction factor k to eq. (1), where k can be seen as the efficiency of SMPS 100:

$$I_{out} = \frac{I_{int}N_P}{DN_s}k \quad (2)$$

When no load is applied to SMPS 100, there is no output current, i.e. $I_{out}$ equals zero. However, there is still an intermediate current, $I_{int}$, which can be seen as an offset current, $I_{int}^{off}$, representing no load losses and which, when introduced into eq. (2), yields the following equation:

$$I_{out} = \frac{(I_{int} - I_{int}^{off})N_P}{DN_s}k \quad (3)$$

Eq. (3) provides an accurate value of the output current, $I_{out}$, in the load range of no load to full load, i.e. between the points indicated by number 1 and number 3 in FIG. 5. However, when the load is increased even further, the converter stage duty cycle, D, becomes very low and the efficiency is deteriorated. Eq. (3) can no longer provide an accurate value of $I_{out}$. It has been derived experimentally that in the load range between the points in FIG. 5 indicated by the numbers 3 and 4, the efficiency is linearly dependent of the converter stage duty cycle, D. We thus get the following expression for the output current, $I_{out}$, in this load range:

$$I_{out} = \frac{(I_{int} - I_{int}^{off})N_p}{DN_s}k(a+bD) \quad (4)$$

For even lower values of the output voltage, $U_{out}$, where D is very low and short circuit is approached, it has been found that a constant relation between $I_{out}$ and $I_{int}$ can be assumed:

$$I_{out} = CI_{int} \quad (5)$$

In this load range, i.e. between the points in FIG. 5 indicated by number 4 and number 5, the intermediate current, $I_{int}$, is preferably held at a fixed value.

According to the above discussion, the following table could advantageously be used to describe the relation between the output current, $I_{out}$, and the intermediate current, $I_{int}$, in the various load ranges of FIG. 5:

TABLE 1

| Load range (according to FIG. 5) | D | $I_{out}(I_{int})$ |
|---|---|---|
| number 1 to number 3 | 0.5-1 | $I_{out} = \frac{(I_{int} - I_{int}^{off})N_p}{DN_s}k$ |
| number 3 to number 4 | 0.1-0.5 | $I_{out} = \frac{(I_{int} - I_{int}^{off})N_p}{DN_s}k(a+bD)$ |
| number 4 to number 5 | <0.1 | $I_{out} = CI_{int}$ |

The values of the converter stage duty cycle, D, given in table 1, should be seen as examples only, and do not constitute fixed limits within which the respective relations between $I_{int}$ and $I_{out}$ can be applied. In the load range between the points of FIG. 5 indicated by number 1 and 4, the intermediate current, $I_{int}$, is regulated according to the relevant regulation method (constant output voltage, constant output power, or constant output current). For the lower voltages, i.e. between the points indicated by number 4 and 5, the intermediate current, $I_{int}$, can preferably be held at a constant value.

When controlling the output signal of SMPS 100, the accuracy of the measurements of the measured quantities is of great importance. One problem of using a programmable digital circuit 600 for the control of SMPS 100 is that analogue to digital (A/D) converters, as is most often used in programmable digital circuits 600, use a limited number of bits for the representation of the converted digital value, and the measurement resolution is thereby limited. The number of bits used by an A/D converter is most often directly related to the price of the A/D converter. It would therefore be desirable to come up with a way of performing accurate measurements of one or more of the measured quantities while keeping the number of bits used by the A/D converter at a reasonable level.

A solution to the problem of the limited resolution of the A/D converters would be to compare the measurement of a quantity with a reference value of the quantity, and, rather than feeding the measurement of the quantity itself to an analogue input of the programmable digital circuit 600, feed the difference between the measured value and the reference value to the programmable circuit 600. Such a difference could e.g. be obtained by use of an operational amplifier. The reference value could, if not already known by programmable digital circuit 600, also be provided to programmable digital circuit 600. A reference value signal to be used for generating the difference could advantageously be generated as a digital pulse width modulated signal, from which an average value is filtered out. The digital pulse width modulated signal of the reference value could e.g. be generated by the programmable digital circuit 600, or by a separate programmable device such as a microprocessor. In this way, changes to the reference value could be conveniently communicated via remote commands to the programmable digital circuit 600 or separate programmable device, and reflected in the generated reference value signal as a change in the width of the pulses in the pulse width modulated signal.

The above described method of comparing the measured quantity with a reference value of the quantity could advantageously be applied to quantities to which the resolution of the A/D conversion is critical and which are regulated according to a reference value (target value). An example of such a quantity is the output voltage, $U_{out}$, of SMPS 100. In many applications of SMPS 100 it is important that the variation of the output voltage, $U_{out}$, in terms of a ripple voltage is kept very low. In an embodiment of the invention in which the programmable digital circuit 600 is located on the primary side of the insulation barrier 140, the measured output voltage signal, $U_{out}^{meas}$, could be transferred across the insulation barrier 140, and the comparison could be performed at the primary side of the insulation barrier 140. Alternatively, the comparison could be performed at the secondary side of the insulation barrier 140, and a signal corresponding to the difference, $U_{out}^{diff}$, between $U_{out}^{meas}$ and the reference value of $U_{out}$, $U_{out}^{ref}$, could then be transferred across the insulation barrier 140. The reference value, $U_{out}^{ref}$, could then preferably be generated by a microprocessor located on the secondary side of the insulation barrier 140. In one embodiment of SMPS 100, the secondary side of the insulation barrier 140 comprises a microprocessor used for communication of parameters to and from SMPS 100 from and to the surrounding environment, such as e.g. to and from a supervision unit. In such cases, this microprocessor could advantageously be used also for the generation of a reference value, $U_{out}^{ref}$. In some cases, such as for monitoring purposes, it may be desirable that information about $U_{out}^{meas}$ as well as $U_{out}^{diff}$ is available to programmable digital circuit 600. If the reference value, $U_{out}^{ref}$, is not already known by the programmable digital circuit 600, it would in such cases be necessary to transfer also the measured output voltage signal, $U_{out}^{meas}$, or the reference value, $U_{out}^{ref}$, across the insulation barrier 140.

Figure 7A:
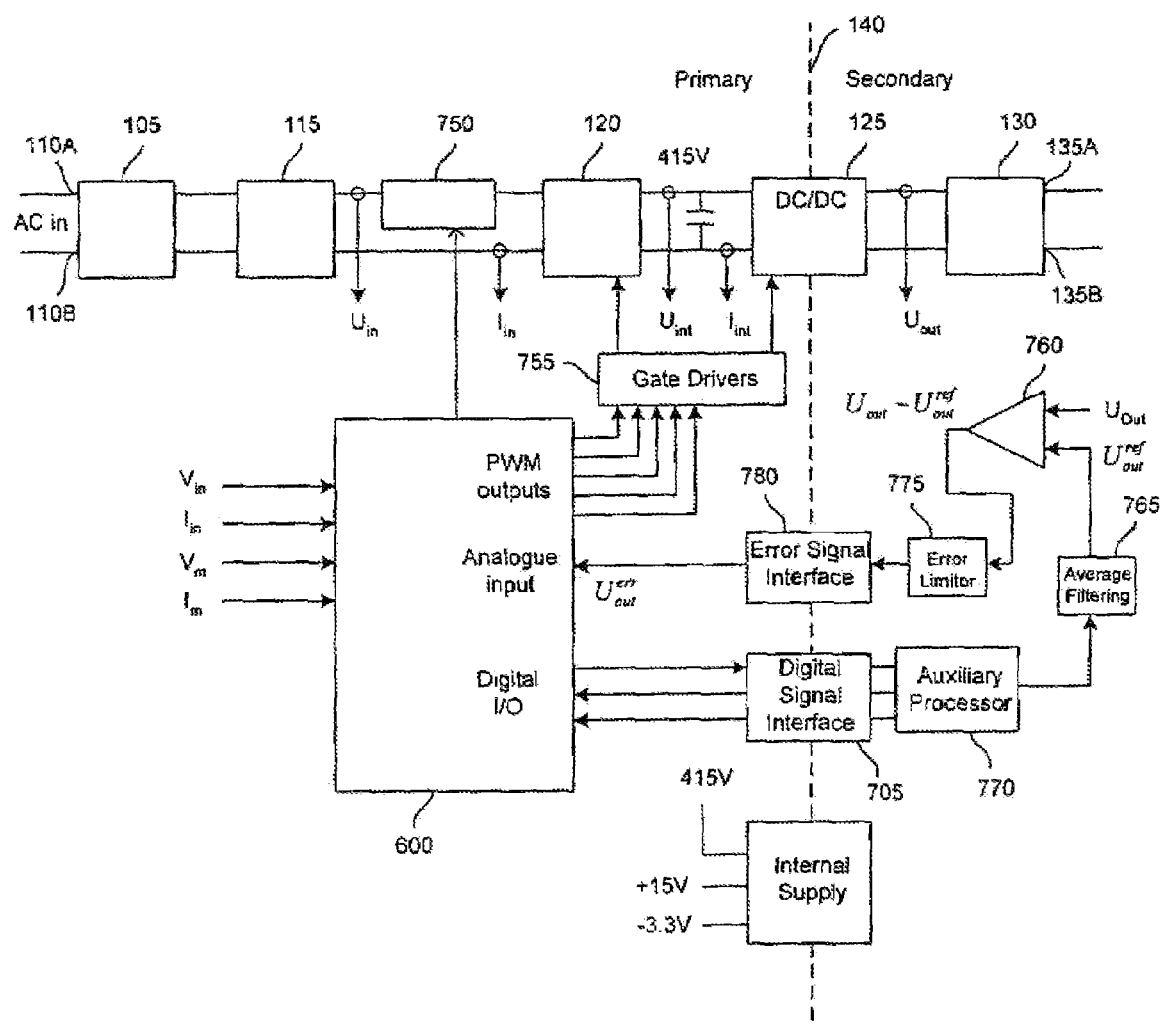
FIG. 7a is a schematic drawing of a switched mode power supply comprising digital control operating in accordance with a first embodiment of the invention.

FIG. 7a schematically illustrates a first embodiment of the invention for the SMPS 100 as discussed above for use with limited resolution A/D converters e.g. with 10 bit resolution and using a constant narrow width window for all frequencies. The programmable digital circuit 600 operates on the primary side and controls the operation of all switching devices in order to maintain an error voltage as close to zero as possible. The measurement quantity of $U_{out}$, taken from the secondary side after the converter stage 125 and is fed into an input of a differential operational amplifier 760. A reference signal $U_{out}^{ref}$ is provided by programmable digital circuit 600 which is fed through the insulating interface 705 to an auxiliary microprocessor 770 having a pulse width modulated output. The auxiliary microprocessor converts the reference signal to a digital pulse width modulated signal, which is sent through a filter 765 where the average value is filtered out prior to being fed into the other input of the operational amplifier 760. The output of the differential amplifier is an analogue error signal $U_{out}^{err}$ which is the difference between the measured output voltage $U_{out}$ and the average value of the reference signal $U_{out}^{ref}$ multiplied by the gain that is ideally unity. The error signal $U_{out}^{err}$ is fed across the insulation barrier via the error signal interface 775 and error limiter 775 to the analogue input of the programmable digital circuit 600 on the primary side.

Based on the error signal, the programmable digital circuit 600 generates the appropriate pulse width modulated signals to control the switching devices in the pre-regulator 120 and converter stage 125. However, after leaving the programmable digital circuit 600, the pulse width modulated signals are sent to a buffer 755 comprising gate driver circuits for conversion into suitable signals that are capable of driving the switches. The operation of the switches based on the error signal fed back from the secondary side improves the regulation by maintaining a constant voltage and suppressing noise on the output signal. The solution provided by the embodiment in general terms utilises a window of about 2V rather than over the entire 0-60V range of the output voltage in order to achieve a resolution of about 2 mV with a 10 bit A/D converter. It should be noted that the invention is not limited to these values and that the invention is applicable to values in the ranges that are higher or lower than those described. A desirable objective is to provide regulation of both the DC component and the noise component or ripple of the output voltage. A disadvantage of using a constant narrow window is that, although it is suitable for the higher frequencies noise components, it is less suitable for the lower frequency DC component since a larger window is needed in situations when the reference voltage varies significantly from the measured output voltage.

Figure 7B:
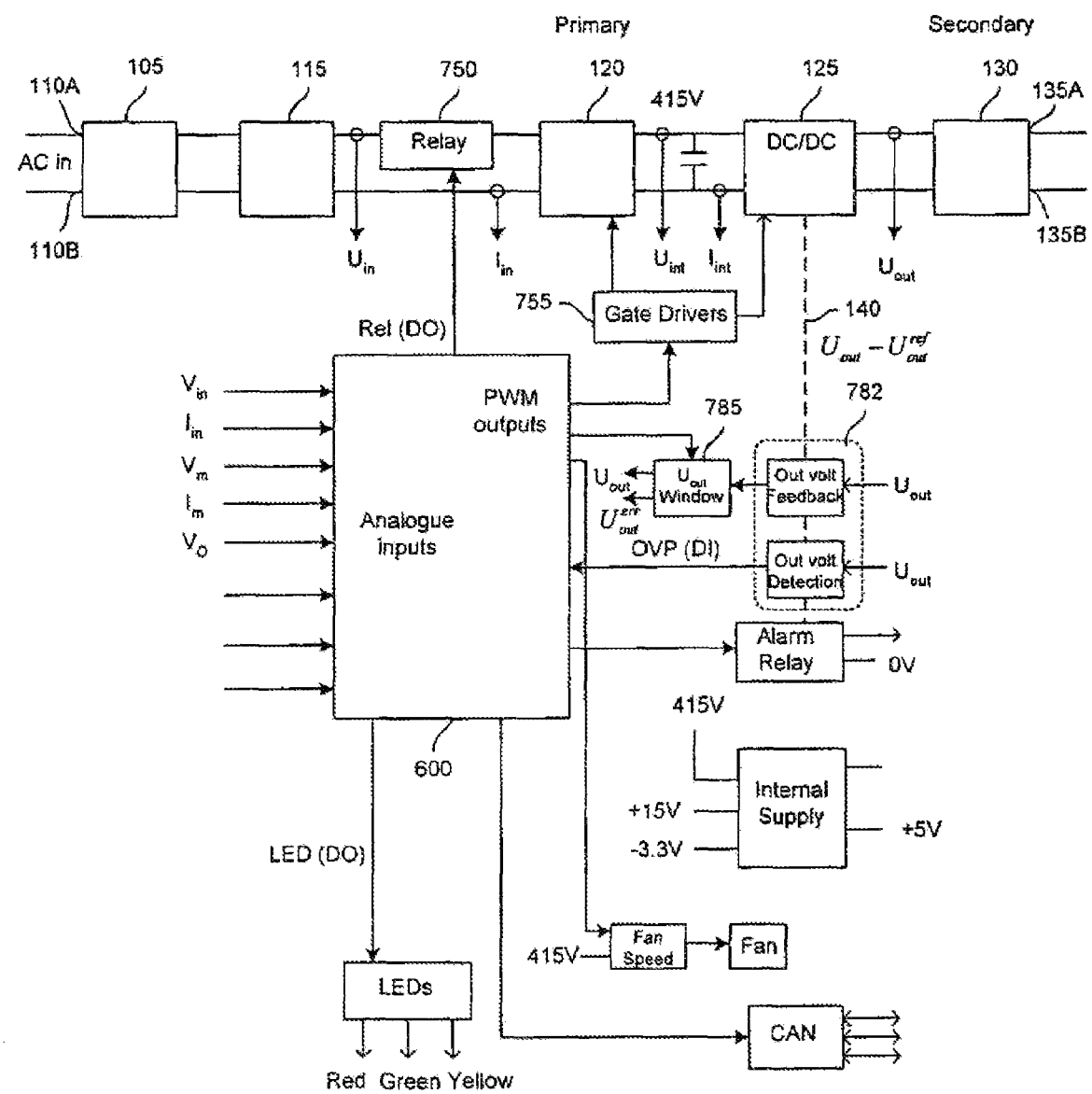
FIG. 7b is a schematic drawing of a switched mode power supply comprising digital control operating in accordance with a second embodiment of the invention.

FIG. 7b schematically illustrates a second embodiment of the invention for the SMPS 100 where the reference signal $U_{out}^{ref}$ is generated by the programmable digital circuit 600 on the primary side as opposed to on the secondary side. In this embodiment, the auxiliary microprocessor 770 is not needed to generate the reference voltage. Instead the output voltage $U_{out}$ is fed directly into the optocoupler 782 on the secondary side to be transferred across the insulation barrier 140. The optocoupler 782 contains blocks 784 and 786 that represent an out volt feedback component and an over volt detection component respectively for sensing an over voltage condition that can overload the circuits. In that case, a signal OVP (DI) is sent to the programmable digital circuit 600 that acts to shut down the circuit and for triggering an associated alarm. The output from the optocoupler 782 and the reference signal $U_{out}^{ref}$, from the programmable digital circuit 600, are fed into a $U_{out}$ window component block 785. The output from the $U_{out}$ window component block 785 are output signals $U_{out}$ and error output signal $U_{out}^{err}$ are fed into the programmable digital circuit 600 for generating the pulse width modulated output signals for driving the switches to regulate the output voltage.

Figure 7C:
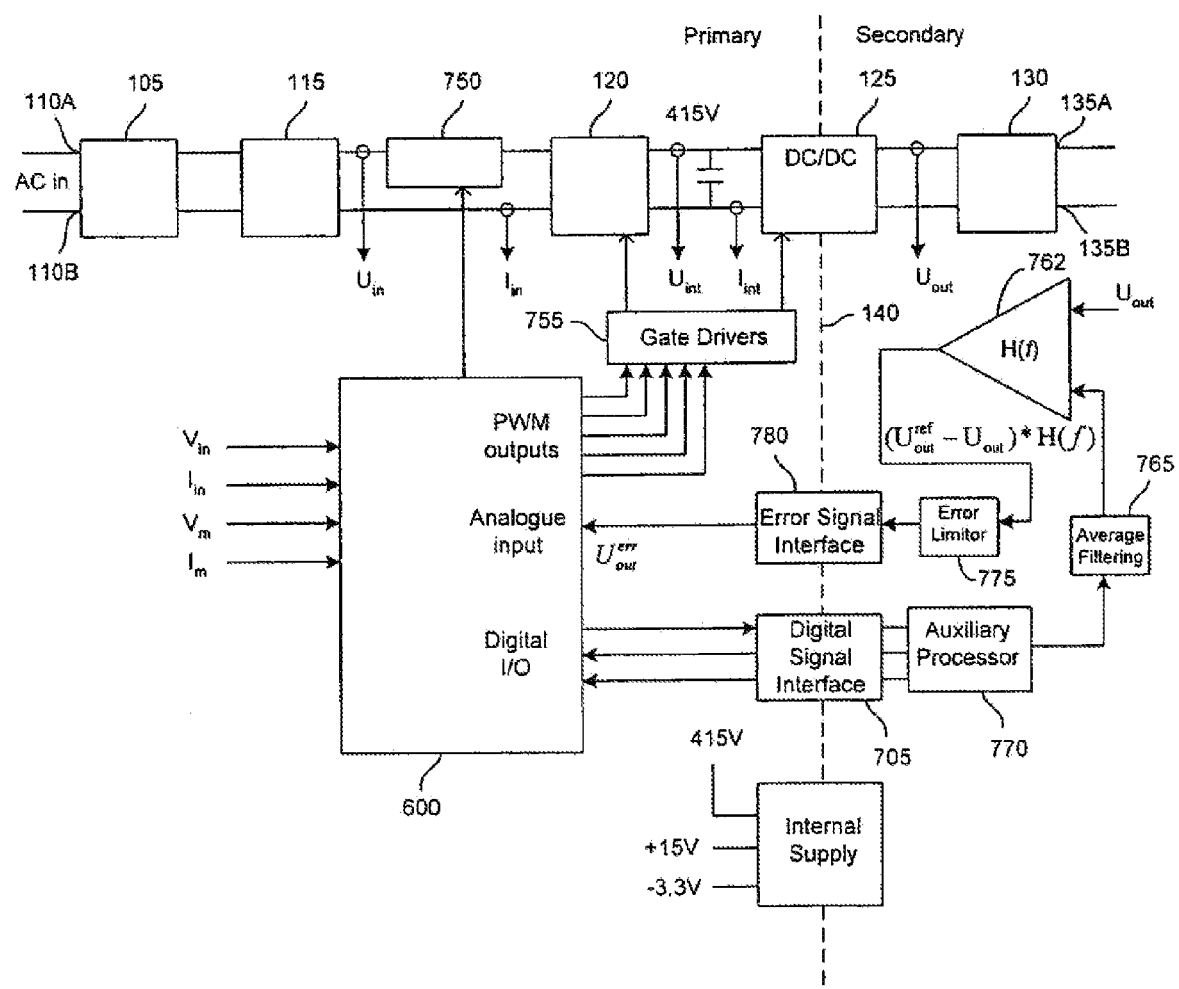
FIG. 7c is a schematic drawing of a switched mode power supply comprising digital control operating in accordance with a third embodiment of the invention.

FIG. 7c schematically illustrates a third embodiment of the invention for the SMPS 100 utilising a frequency dependent amplifier 762 that provides more effective regulation of the output voltage. The embodiment is similar to that in FIG. 7a except for the use of frequency dependent amplifier that provides a frequency dependent window that is narrow for the high frequency components such as noise, and a larger window for the DC component of the output voltage. The output voltage $U_{out}$ and the reference signal $U_{out}^{ref}$ from the auxiliary microprocessor 770 are fed into the frequency dependent amplifier 762 to produce an output error signal $U_{out}^{err}$. The transfer function of the frequency dependent amplifier 762 can be represented as $(U_{out}^{ref} - U_{out})*H(f)$, where H(f) acts to amplify the higher frequency components such as noise and to attenuate or reduce the lower frequency DC components. This conveniently enables the high frequency noise components and the low frequency DC component to be converted into a range that can usable within the resolution of the A/C converter. The output error signal from the amplifier is fed into the analogue input of the programmable digital circuit 600 where the A/C conversion takes place. Furthermore, in the programmable digital circuit 600, the reverse transfer function $H^{-1}(f)$ is applied to the signal to retrieve a digital representation of the original output error signal, from which, the pulse width modulated outputs are generated to drive the switches for regulating the output voltage.

The embodiment utilises a frequency dependent output error voltage signal to effectively provide a narrow window for noise components or ripple thereby providing the higher accuracy needed for noise suppression and a larger window for the steady state DC component requiring less accuracy. The embodiment is especially effective in situations where the output voltage $U_{out}$ and the reference voltage signal $U_{out}^{ref}$ are significantly different, for example, in high current and high voltage loads. A larger window is adapted to the voltage difference permitting the A/D converter to continue to operate below the saturation point thereby extending the operating range of the SMPS 100. A further advantage is that the cost is significantly reduced since a single processor can be used to control all of the regulation switching devices using a minimal number of interface components.

Figure 7D:
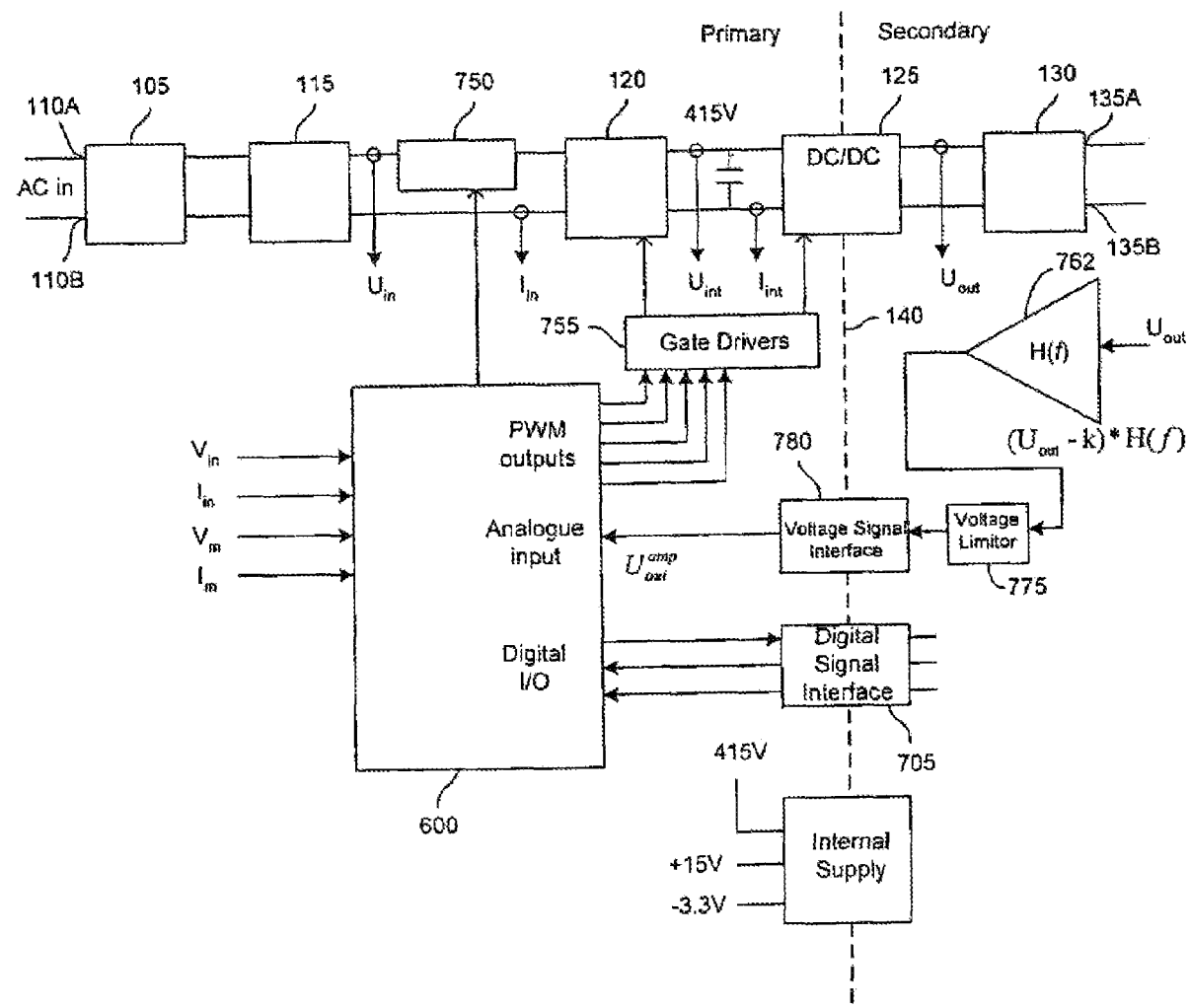
FIG. 7d is a schematic drawing of a switched mode power supply comprising digital control operating in accordance with a forth embodiment of the invention.

FIG. 7d schematically illustrates a forth embodiment of the invention for the SMPS 100 utilising a frequency dependent amplifier 762 operating in a similar manner to that in FIG. 7c. When generating the reference voltage signal $U_{out}^{ref}$ on the primary side, e.g. by software within the programmable digital circuit 600, it would allow the analogue signals on the secondary side to be transmitted through the insulation barrier 140 with a slightly larger active area than would otherwise be the case. In the present embodiment, the output voltage signal $U_{out}$ is the sole input to the amplifier, whereby the output signal from the amplifier $U_{out}^{amp}$ can be represented as $(U_{out}-k)*H(f)$, where k is an offset voltage and H(f) is the transfer function that tends to amplify the higher frequency components and attenuate the lower frequency components.

The output signal $U_{out}^{amp}$ is fed into the programmable digital circuit 600 where the reverse transfer function $H^{-1}(f)$ is applied to retrieve a digital representation of the original signal. This together with the reference signal inter alia, is used to generate the pulse width modulated output signals for driving the switches to regulate the output voltage. An advantage of the present embodiment is that it able to provide noise suppression in the manner previously described in addition to improving DC voltage regulation. By way of illustration, a power supply having a 54.5V nominal output voltage, the frequency dependent amplifier enables accurate measurement of the DC component and lower frequencies with e.g. a window between 30-60V, and the higher frequency components with a window of ±1V or ±0.5V, for example.

Figure 8:
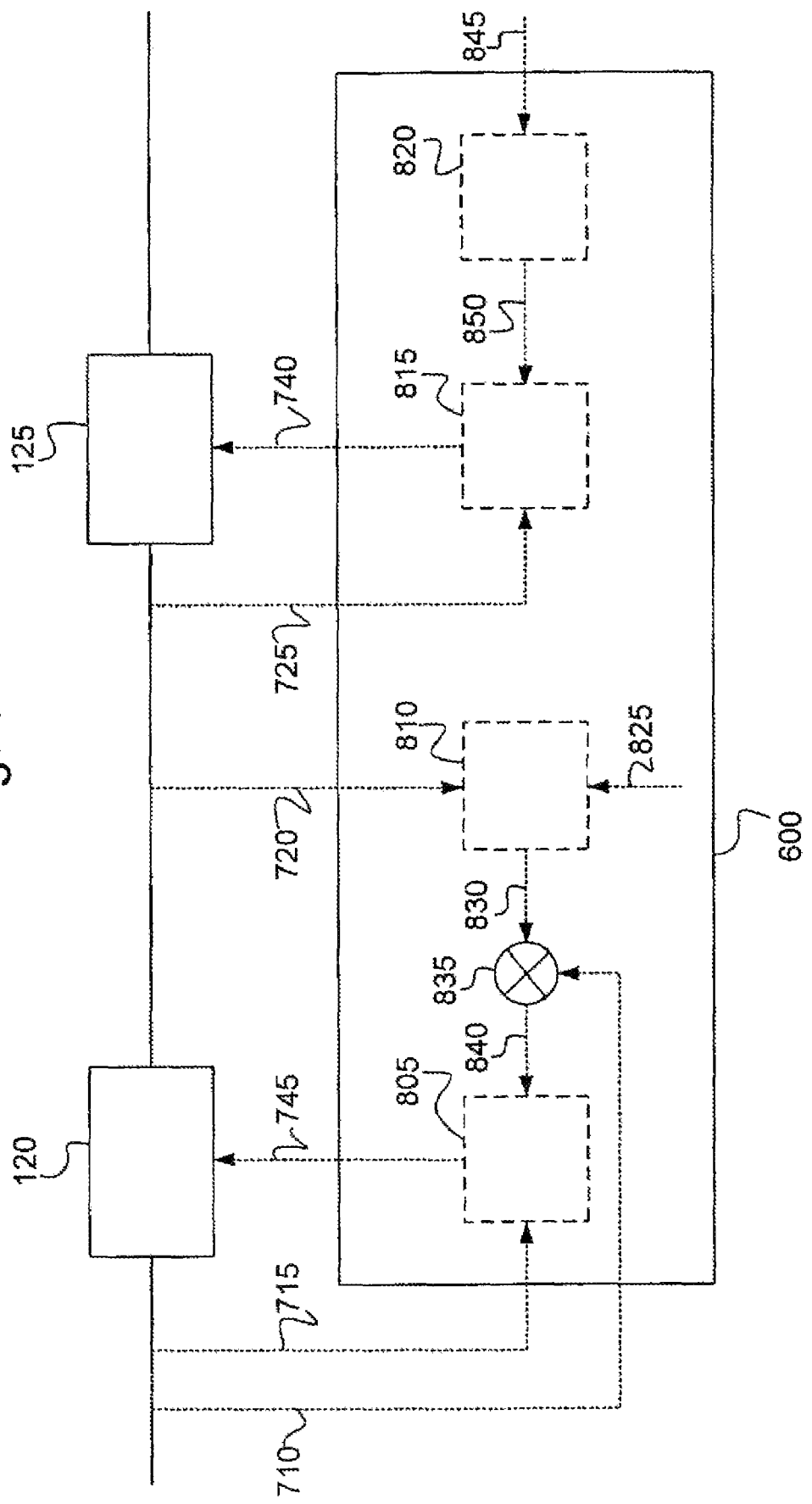
FIG. 8 is schematic drawing illustrating the regulation performed by the programmable digital control.

FIG. 8 schematically illustrates the regulation loops that are used for the regulation of pre-regulator 120 and converter stage 125, respectively, in an embodiment of the invention where the above described method of deriving values of the output current, $I_{out}$, from measured values of the intermediate current, $I_{int}$, is implemented, as well as the above described method of feeding $U_{out}^{diff}$ to the programmable digital circuit 600. Four different regulators, that are implemented as computer program code in programmable digital circuit 600, is illustrated in the figure: current regulator 805 and voltage regulator 810 for the regulation of the switching element 420 of pre-regulator 120, and current regulator 815 and voltage regulator 820 for the regulation of the switching element(s) 205 of converter stage 125. The voltage regulators 810 and 820 are preferably implemented as outer, slower loops, while the current regulators 805 and 815 are preferably implemented as inner, faster loops. Voltage regulator 810 receives a signal 720 representing of the value of the intermediate voltage, $U_{int}$, and a further signal 825 indicative of the reference value for $U_{int}$, $U_{int}^{ref}$. $U_{int}^{ref}$ may be calculated by programmable digital circuit 600 based on measurements of the mains voltage, $U_{ac}$, or may be a fixed value known by voltage regulator 810. Based on a number of measurements of $U_{int}$, voltage regulator 810 could use a standard PI-regulation method in order to determine a reference value for the input current, $I_{in}^{ref}$. A signal 830 indicative of $I_{in}^{ref}$ is preferably multiplied in multiplier 835 by the signal 710 representing the input voltage, $U_{in}$, in order to obtain a harmonic shape of $I_{in}^{ref}$. The output signal 840 of the multiplier 835 represents the reference value for the input current, $I_{in}^{ref}$, and is fed to the current regulator 805. Current regulator 805 further receives a signal 715 representing a measured value of $I_{in}$. Based on $I_{in}^{ref}$ and a number of measurements of $I_{in}$, the current regulator 805 can use a standard PI-regulation method in order to determine a duty cycle of the switching element 420 of pre-regulator 120. A pulse width modulated signal 745, indicating the desired on and off time of switching element 420 that yields the duty cycle determined by current regulator 805, is transmitted to pre-regulator 120.

Similarly, the voltage regulator 820 of FIG. 8 receives a signal 845 representing the difference, $U_{out}^{diff}$, between a measured value of the output voltage, $U_{out}$, and reference value for the output voltage, $U_{out}^{ref}$. Based on a number of received values of $U_{out}^{diff}$, voltage regulator 820 can use a standard PI-regulation method in order to determine a reference value for the intermediate current, $I_{int}^{ref}$. A signal 850 representing $I_{int}^{ref}$ is transmitted to current regulator 815, which also receives a signal 725 representing a measured value of $I_{int}$. Based on $I_{int}^{ref}$ and a number of measurements of $I_{int}$, current regulator 815 can use a standard PI-regulation method in order to determine the converter stage duty cycle, D. A pulse width modulated signal 740, representing the desired on and off time of switching element 205 that yields the converter stage duty cycle, D, determined by current regulator 815, is transmitted to converter stage 125. Depending on the regulation mode of the SMPS 100, cf. FIG. 5, the parameters that determine the regulation vary. Signal 740 is also referred to as the converter stage duty cycle control signal $D_{CCS}$.

In effect, the combined control of pre-regulator 120 and converter stage 125 enables an advantageously accurate control of the output voltage $U_{out}$ as well as of the output current $I_{out}$.

With reference to FIG. 5, the Switched Mode Power Supply (SMPS) 100 is controlled to deliver a substantially constant voltage $U_{out}$ when operated to work in the range between the points indicated by number 1 and number 2 in FIG. 5.

Figure 8B:
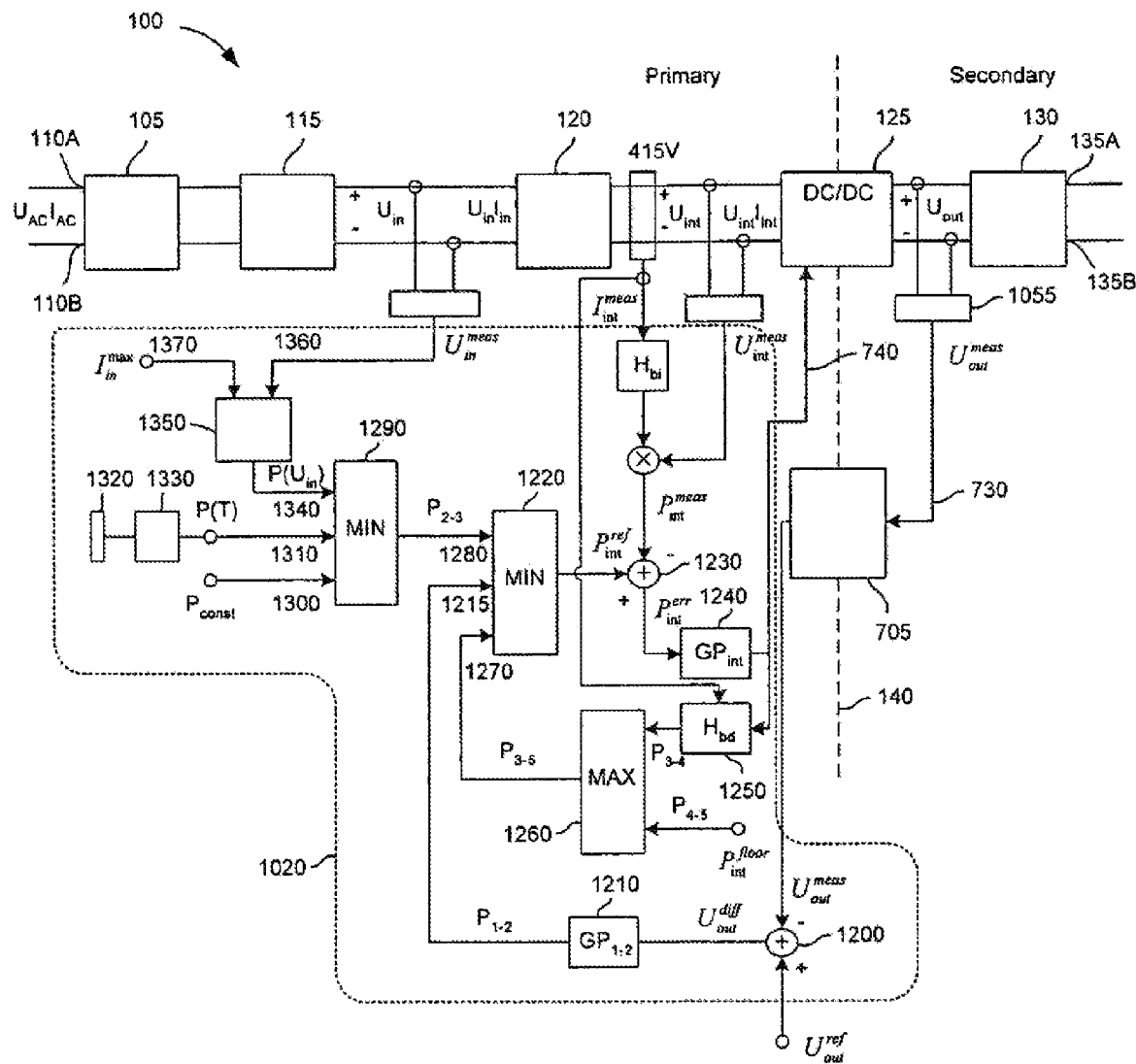
FIG. 8B is a block diagram illustrating in some further detail the control of the converter stage according to an embodiment of the invention.

FIG. 8B is a block diagram illustrating in some further detail the control of the converter stage 125 according to an embodiment of the invention. More specifically FIG. 8B illustrates an embodiment of a converter stage output voltage controller 1020 operating to achieve a desired output voltage. The converter stage output voltage controller 1020 can operate in three different modes, i.e.

mode $M_{1-2}$ (rendering substantially constant output voltage, as indicated between points 1 and 2 in FIG. 5); or mode $M_{2-3}$ (rendering substantially constant output power, as indicated between points 2 and 3 in FIG. 5); or mode $M_{3-5}$ (rendering substantially constant output current, as indicated between points 3 and 5 in FIG. 5).

The converter stage output controller 1020 operates to control the value of the converter stage duty cycle D. The output current $I_{out}$ is dependent on the converter stage duty cycle D. Hence, the output current $I_{out}$ can be controlled in response to the converter stage duty cycle D. The converter stage output controller 1020 is at least partly embodied by a digital control circuit 600, as disclosed in connection with FIGS. 6, 7 and 8A above.

With reference to FIG. 8B, a voltage sensor 1055 measures the output voltage $U_{out}$ and delivers a measured value $U_{out}^{meas}$ (also referred to as 730) to insulating interface 705, which delivers a corresponding signal $U_{out}^{meas}$ to an input of adder 1200. Adder 1200 also has a second input 1050 for receiving an output voltage reference value. An output of adder 1200 is coupled to an input of a controller 1210. The controller 1210 generates a signal $P_{1-2}$ for controlling the output voltage in mode $M_{1-2}$. The output of controller 1210 is coupled to a first input 1215 of a minimum input selector 1220.

The minimum input selector 1220 has an output delivering a power reference value $P_{int}^{ref}$. The output of minimum input selector 1220 is coupled to deliver the power reference value $P_{int}^{ref}$ to an adder 1230. The adder 1230 also has an input for receiving a value $P_{int}^{meas}$ indicative of a measured power. The measured power $P_{int}^{meas}$ is indicative of the electric power consumed by converter stage 125. Adder 1230 generates the value $P_{int}^{err}$ as the difference between values $P_{int}^{ref}$ and $P_{int}^{meas}$. The power error signal $P_{int}^{err}$ is delivered to a regulator 1240. The regulator 1240 generates a converter stage duty cycle control signal 740, $D_{CCS}$ for causing the switching elements 205A, 205B, 205C, and 205D to generate the duty cycle D.

The output of regulator 1240 is also coupled to a feedback regulator 1250, whose output is coupled to an input of a maximum input selector 1260. The maximum input selector 1260 has another input for receiving a lowest allowed power reference value, $P_{int}^{floor}$. The maximum input selector 1260 delivers on its output the highest of the input values. The output of maximum input selector 1260 is a reference value $P_{3-5}$ for the power $P_{int}$ in the mode $M_{3-5}$, rendering constant output current. The output of maximum input selector 1260 is coupled to a second input 1270 of minimum input selector 1220.

The Constant Power Control Part of Output Signal Controller 1020

The minimum input selector 1220 also has a third input 1280 for receiving a reference value $P_{2-3}$ for controlling the power $P_{int}$ in the mode $M_{2-3}$, rendering constant output power. The third input 1280 is coupled to an output of a minimum input selector 1290.

Minimum input selector 1290 has a plurality of inputs for allowing to control the maximum power of the SMPS 100. Accordingly, minimum input selector 1290 embodies a power limiter 1290. A first input 1300 is coupled to receive a pre-determined reference value $P_{const}$. The pre-determined reference value $P_{const}$ may be set to a value indicative of the highest possible power to be delivered by SMPS 100. In a typical case $P_{const}$ may be for example 1500 watts. The maximum power $P_{const}$ may be the power delivered when the output voltage and the output current follows the line between points 2 and 3 in FIG. 5.

A second input 1310 of minimum input selector 1290 is coupled to receive a temperature dependent reference value P(T). The reference value P(T) is temperature dependent so as to reduce the maximum allowed power delivery of the SMPS 100 when the temperature increases. Accordingly a temperature sensor 1320 is applied at an appropriate place in the SMPS 100, and in response to the detected temperature a controller 1330 generates the temperature dependent power reference value P(T). This solution advantageously makes it possible to avoid overheating of components in the SMPS 100 by cutting the delivered power in dependence of an increasing temperature.

The maximum power P(T) may be the power delivered when the output voltage and the output current follows the line between points 2' and 3' in FIG. 5. The value P(T) may be a linearly dependent on the measured temperature T so that point 2' slides along the constant-voltage-level $U_{1-2}$ in FIG. 5, and point 3' slides along the constant-current-level $I_{3-4}$ in FIG. 5.

A third input 1340 of minimum input selector 1290 is coupled to receive a voltage dependent power limit value $P(U_{in})$. This is for the purpose of limiting the output power of SMPS 100 if the voltage of the received electric power decreases in order to prevent the SMPS 100 from drawing too much current from the mains power supply. This advantageously provides an active control of the maximum current drawn by SMPS 100 via the input terminals 110, thereby preventing a the SMPS 100 from exceeding a predetermined current limit $I_{in}^{max}$.

According to an embodiment the voltage dependent power limit value $P(U_{in})$ is generated by a device 1350 having an input 1360 coupled to receive a signal $U_{in}^{meas}$ indicative of the voltage $U_{in}$.

In one version of the invention the device 1350 has a second input 1370 for receiving a pre-determined upper current limit value $I_{in}^{max}$, and device 1350 operates to multiply the current limit value $I_{in}^{max}$ by the measured voltage value $U_{in}^{meas}$ so as to generate the voltage dependent power limit value $P(U_{in})$. This advantageously simple solution provides a voltage dependent power limit value $P(U_{in})$ that decreases when the mains power supply voltage decreases, thereby automatically limiting the power consumption of SMPS 100 so that it never draws a current higher than the upper current limit value $I_{in}^{max}$. The pre-determined upper current limit value $I_{in}^{max}$ may be a constant value selected so that the current $I_{ac}$ is kept below a certain limit value. Alternatively, the pre-determined upper current limit value $I_{in}^{max}$ may be selected so that maximum output power $P_{out}$ from the converter stage 125 (i.e. power $P_{2-3}$ in FIG. 5) is kept below a certain threshold value. This may be achieved by deciding an output power threshold value $P_{out}^{max}$, calculating the losses in stages 115, 120 and 125 of SMPS 100, and setting the threshold value to be delivered on input 1340 to a value indicative of the sum of the output power threshold value $P_{out}^{max}$ and the losses.

The Constant Current Control Part of Output Signal Controller 1020

Feedback regulator 1250 operates to generate a power reference value $P_{3-4}$ such that the output current remains substantially constant. This is achieved in dependence on a current value and a feedback signal indicative of the converter stage duty cycle D. The current value may be the measured output current $I_{out}$ or the internal current $I_{int}$.

Output Current Control Using Estimated Feedback Signal

According to a preferred embodiment the feedback regulator 1250 has a first input for receiving the converter stage duty cycle control signal $D_{CCS}$ and a second input for receiving the measured internal current value $I_{int}^{meas}$, as illustrated in FIG. 8B. In the FIG. 8B embodiment the output current value $I_{out}$ is estimated on the basis of the internal current $I_{int}$ and the converter stage duty cycle D, and the feedback regulator 1250 operates to generate a power reference value $P_{3-4}$ in response to said estimated output current value $I_{out}^{est}$ such that the output current remains substantially constant. The estimated output current $I_{out}^{est}$ may be obtained in accordance with equation (4), as discussed in connection with table 1 above.

Figure 8C:
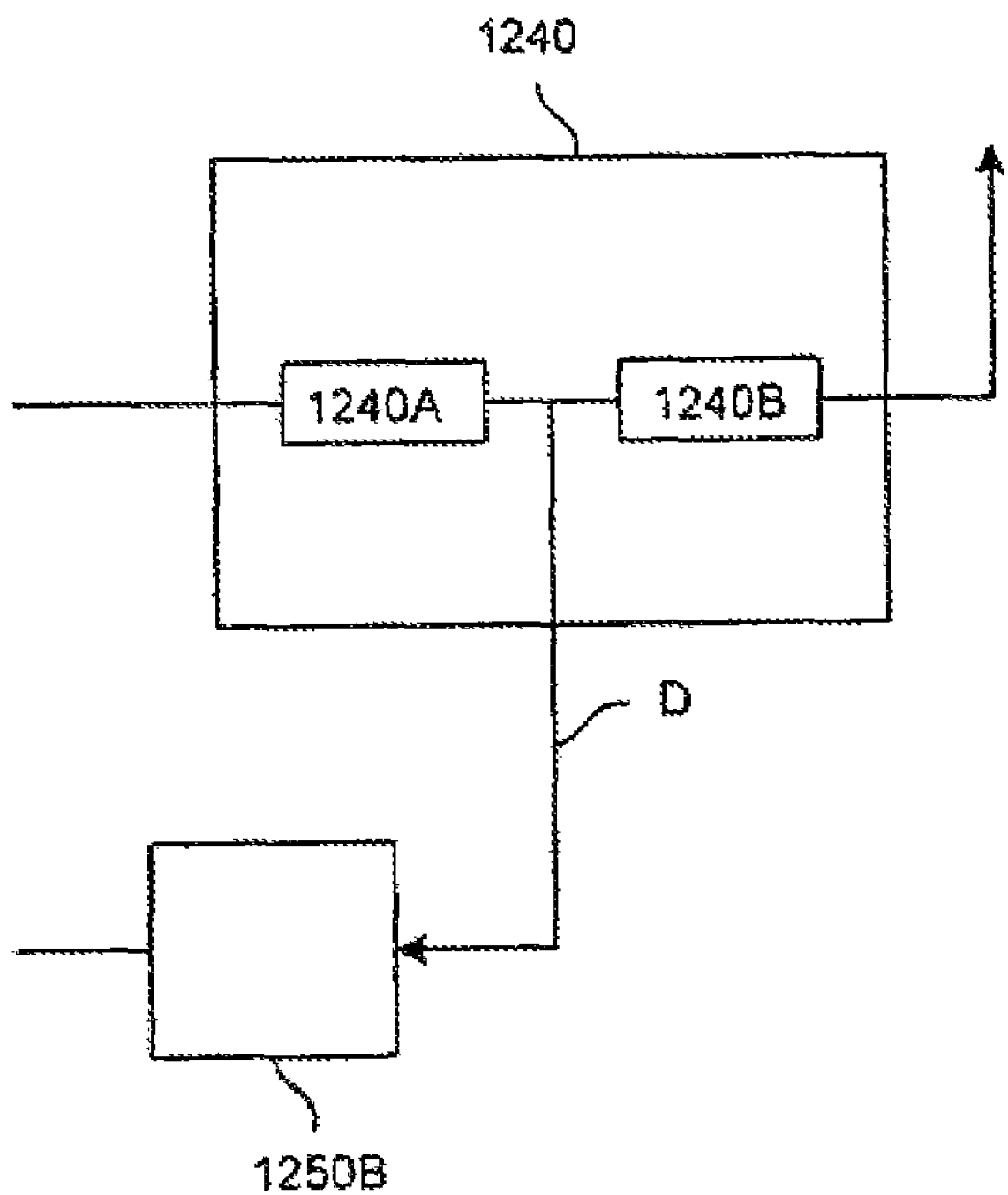
FIG. 8C is a block diagram illustrating an alternative embodiment of the regulator 1240 generating the converter stage duty cycle control signal 740, and of a feedback regulator 1250B shown in FIG. 8B.

FIG. 8C is a block diagram illustrating an alternative embodiment of the regulator 1240 generating the converter stage duty cycle control signal 740, and of a feedback regulator 1250B shown in FIG. 8B. According to the FIG. 8C embodiment the regulator 1240 comprises a duty cycle value generator 1240A adapted to generate the value of the duty cycle D in dependence on the power error signal $P_{int}^{err}$. The value D is delivered to a control signal generator 1240B and to the feedback regulator 1250B. The feedback regulator 1250B is adapted to generate estimated output current $I_{out}^{est}$ may be obtained in accordance with equation (4), as discussed in connection with table 1 above, based on the received value D and the measured internal current value $I_{int}^{meas}$. The feedback regulator 1250B is also adapted to generate a power reference value $P_{3-4}$ in response to said estimated output current value $I_{out}^{est}$ such that the output current remains substantially constant.

Output Current Control Using Measured Feedback Signal $I_{out}^{meas}$

According to another embodiment the feedback regulator 1250 receives a measured value 735, $I_{out}^{meas}$ indicative of output current $I_{out}$. The measured value 735, $I_{out}^{meas}$ may be transferred across the insulation barrier as indicated in FIG. 7. In this embodiment the feedback regulator 1250 has an input for receiving the measured value 735, $I_{out}^{meas}$, but it does not need to have any information about the duty cycle D.

Operation of Converter Stage Output Controller 1020 in Mode $M_{1-2}$

When converter stage output voltage controller 1020 operates in mode $M_{1-2}$ the aim is to render constant output voltage, as indicated between points 1 and 2 in FIG. 5.

When the converter stage output voltage controller 1020 operates in mode $M_{1-2}$ it uses a reference value $U_{out}^{ref}$. The reference value $U_{out}^{ref}$ is delivered on an input 1050 (See FIG. 8B) of an adder 1200. The adder 1200 also receives a value $U_{out}^{meas}$ indicative of the output voltage as a negative feedback signal. Accordingly, adder 1200 generates a difference signal $U_{out}^{diff}$, and the signal $U_{out}^{diff}$ is delivered to a block 1210 having a transfer function $G_{P1-2}$. The block 1210 delivers a control signal $P_{1-2}$ to an input 1215 of minimum input selector 1220. It is to be understood that in mode $M_{1-2}$ the converter stage output voltage controller 1020 operates to maintain a constant output voltage $U_{out}$ at the level $U_{1-2}$ indicated in FIG. 5.

When the control signal $P_{1-2}$ at input 1215 has a lower value than that of input 1280 and that of input 1270, then the minimum input selector 1220 sets the output $P_{int}^{ref}$ equal to $P_{1-2}$. Adder 1230 compares the reference value $P_{int}^{ref}$ with the feedback signal, i.e. the measured value of the internal power $P_{int}^{meas}$ so as to generate an error signal $P_{int}^{err}$. The regulator 1240 generates a converter stage duty cycle control signal 740, $D_{CCS}$ in response to the error signal $P_{int}^{err}$.

In this manner the converter stage output voltage controller 1020 generates the duty-cycle D in dependence on the output voltage $U_{out}$, when the converter stage output voltage controller 1020 operates in mode $M_{1-2}$.

The value of duty cycle D affects the amount of current $I_{int}$ that is drawn by converter stage 125. Accordingly the current $I_{int}$ can be controlled in response to the duty cycle D. The control of current $I_{int}$ also enables control of the output voltage $U_{out}$. It can be shown that the output voltage $U_{out}$ depends on the current $I_{int}$. Hence, converter stage output voltage controller 1020 is capable of controlling the output voltage $U_{out}$ in response to the duty cycle D.

The dependency of the output voltage $U_{out}$ on the current $I_{int}$ can be intuitively understood from the following: From equation (3) above, it is clear that in the constant voltage mode $M_{1-2}$ the output current $I_{out}$ is directly proportional to the internal current $I_{int}$ for a given duty cycle D. Hence, when current $I_{int}$ is increased in response to the duty cycle D, the output current $I_{out}$ is also increased. An increased output current $I_{out}$ renders an increased voltage $U_{out}$ as long as the load can be regarded as resistive or reactive.

Operation of Converter Stage Output Voltage Controller 1020 in Mode $M_{2-3}$ Operation in mode $M_{2-3}$ renders constant output power. With reference to FIG. 5 constant output power mode $M_{2-3}$ is entered when the internal power $P_{int}$ reaches the lowest of the limit power levels delivered on inputs of power limiter 1290.

The co-operation of power limiter 1290 and the power limiter 1220 causes the converter stage output controller 1020 to leave constant voltage mode $M_{1-2}$ and enter constant power mode $M_{2-3}$, thereby reducing the output voltage, as indicated between points 2 and 3 in FIG. 5.

Operation of Converter Stage Output Voltage Controller 1020 in Mode $M_{3-5}$ Operation in mode $M_{3-4}$ renders constant output current $I_{out}$. With reference to FIG. 8B constant output current mode $M_{3-4}$ is entered when the reference level $P_{3-5}$ provides the lowest value to power limiter 1220, i.e. when the input 1270 receives a lower power reference value than that received on inputs 1215 and 1280. With reference to FIG. 8B and FIG. 5 the constant output current mode $M_{3-4}$ is entered when the output current limiter 1260 receives a higher reference value $P_{3-4}$ from block 1250 than the reference value floor $P_{int}^{floor}$.

Output Current Control Using Estimated Feedback Signal

According to a preferred embodiment the feedback regulator 1250 has a first input for receiving the converter stage duty cycle control signal $D_{CCS}$ and a second input for receiving the measured internal current value $I_{int}^{meas}$, as illustrated in FIG. 8B. In the FIG. 8B embodiment the output current value $I_{out}$ is estimated on the basis of the internal current $I_{int}$ and the converter stage duty cycle D, and the feedback regulator 1250 operates to generate a power reference value $P_{3-4}$ in response to said estimated output current value $I_{out}^{est}$ such that the output current remains substantially constant. The estimated output current $I_{out}^{est}$ may be obtained in accordance with equation (4), as discussed in connection with table 1 above. Unfortunately, it has been found that when operating in mode $M_{3-5}$ and using said estimated output current value $I_{out}^{est}$ in accordance with equation (4), the accuracy of the estimated value $I_{out}^{est}$ deteriorates for small values of D. Accordingly, if the control signal $P_{3-5}$ (FIG. 8B) is generated in response to an estimated output current value which is calculated with equation (4), then the actual output current would fluctuate when the estimate is based on small values of D. In order to avoid undesired fluctuations of the actual output current $I_{out}$ the transition point 4 should be set to a suitable duty cycle threshold value.

In other words, there is a transition from using the control signal $P_{3-4}$ to using the control signal $P_{4-5}$. In accordance with an embodiment of the invention the output current limiter 1260 and the feedback regulator 1250 co-operate so that this transition occurs when the value of duty cycle D falls short of a certain duty cycle threshold value. The duty cycle threshold value is 0.4 according to an embodiment of the invention.

According to another embodiment the duty cycle threshold value is 0.2. According to a preferred embodiment the duty cycle threshold value is 0.1.

Figure 9A:
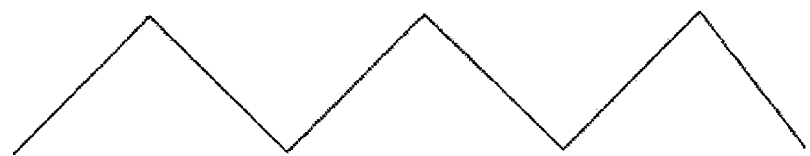
FIG. 9 illustrates the control of the switching elements of a converter stage comprising a fullbridge.
Figure 9B:
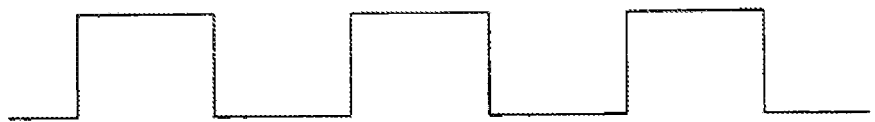
Figure 9C:
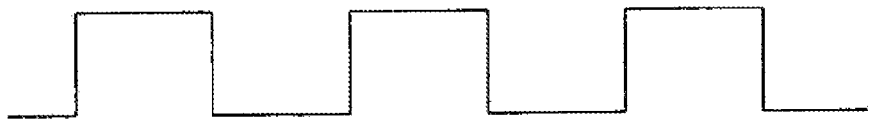

In cases when converter stage 125 comprises a fullbridge 200, signal 740 preferably comprises four signals 740A-D for the regulation of the four switching elements 205A-D of fullbridge 200. In order to obtain the desired converter stage duty cycle, D, of the converter stage 125, a timer in the programmable digital circuit 600 determines the pulse width modulated signals 740A-D. The timer comprises a digital counter. One leg of fullbridge 200, consisting of a vertical pair of switching elements, 205A and 205C of FIG. 2 (or 205B and 205D), generates a pulse train to one terminal of the transformer 210. The other leg of fullbridge 200, consisting of switching elements 205B and 205D of FIG. 2, (or 205A and 205C) is feeding an identical, but phase shifted, pulse train to the other terminal of transformer 210. This is schematically illustrated in FIG. 9a-c. FIG. 9a illustrates the digital counter in the programmable digital circuit 600 that determines the output voltage of fullbridge 200. The digital counter of FIG. 9a furthermore determines the complete sampling sequence in the pre-regulator 120 and converter stage 125. FIG. 9b shows the voltage as a function of time at the midpoint of one of the legs of fullbridge 200, i.e. between switching elements 205A and 205C (or between 205B and 205D). FIG. 9c shows the voltage as a function of time at the midpoint of the other of the leg of fullbridge 200, i.e. between switching elements 205B and 205D (or between 205A and 205C). Hence, the difference between the voltages illustrated in FIGS. 9b and 9c is the voltage across the primary side of transformer 210, $U_{primary}$. By phase shifting the voltages illustrated in FIGS. 9b and 9c with respect to each other, the converter stage duty cycle, D, can be varied. When the voltage shown in FIG. 9b is positive, switching element 205A is conducting, and switching element 205C is off. Similarly, when the voltage shown in FIG. 9c is positive, switching element 205B is conducting, while switching element 205D is off. Thus, by phase shifting the pulse width modulated signals 740A and C with respect to the pulse width modulated signals 740B and D, the fullbridge 200 can be controlled to generate a desired converter stage duty cycle, D. The pulse width modulated signals 740A-D received by switching elements 205A-D could preferably be of a duty cycle of 50%, or slightly lower. By using a duty cycle slightly lower than 50%, the risk of both switching elements 205A and 205C (205B and 205D) of the same leg of fullbridge 200 being switched on at the same time is reduced. Furthermore, the short time period thus introduced during which none of the switching elements 205A and 205C (205B and 205D) of the same leg are switched on can be used for recharging of output capacitors in the switching elements 205A and 205C (205B and 205D), yielding soft switching of switching elements 205.

The switching elements of pre-regulator 120 and converter stage 125, such as switching elements 420 and 205A-D, could preferably be implemented as power transistors, such as e.g. metal-oxide semiconductor field-effect transistors (MOSFETs), insulated gate bipolar transistors (IGBTs), junction field-effect transistors (JFETs) or bipolar transistors. Programmable digital circuit 600 could advantageously be implemented as a digital signal processor (DSP), a field programmable gate array (FPGA), or as any other programmable digital circuit which can provide signal processing at sufficient speed.

The above described SMPS 100 could be varied in many ways without departing from the spirit of the invention. For example, the converter stage 125 could be a fly-back converter type. The pre-regulator 120 could then preferably be omitted, and the switching element of the fly-back converter could be controlled by the programmable digital circuit 600. In another embodiment, the converter stage 125 could be a DC/AC converter, the SMPS 100 then being an inverter. Furthermore, the SMPS 100 illustrated in FIG. 7 is a single-phase SMPS. However, the invention is equally applicable to a three-phase SMPS. In a three-phase SMPS, the diode bridge 10 could preferably be omitted, and the pre-regulator 120 could preferably comprise six different switching elements 420, each being controlled by digital programmable circuit 600. Alternatively, two or more different digital programmable circuits 600 could be used for the control of the three-phase SMPS 100.

In a typical power system, a number of SMPS 100 are connected to a distribution unit, to which the applied load is connected. A power system 1000 is schematically illustrated in FIG. 10. The outputs of three SMPSs 100A-C, as well as a battery 1005, are connected in parallel to the input of a distribution unit 1010. Two different loads 1015A-B are connected to the output of distribution unit 1010.

Figure 10A:
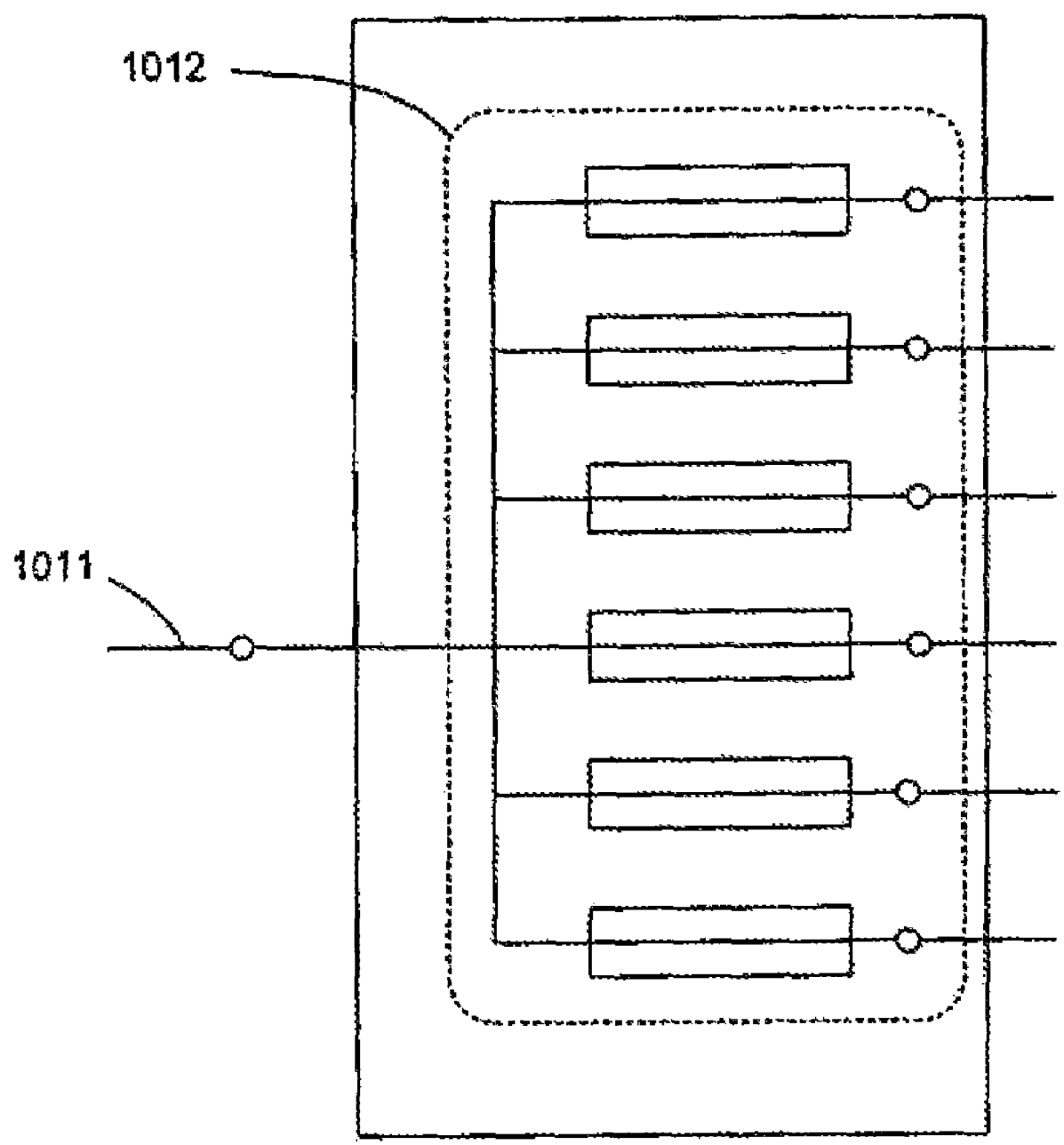
FIG. 10 is an example of a power supply system comprising several switched mode power supplies.

FIG. 10a depicts an exemplary simplified schematic diagram of the distribution unit 1010 shown in FIG. 10. A plurality of fuses 1012 are connected in parallel to input line 1011 carrying power from the power system 1000 whereby each of the loads e.g. 1015A and 1015B are connected to the fuses. This enables the separate loads to operate independently and smoothly from each other and protects the system from a fault or short-circuit caused by a particular load. Obviously, the number of SMPSs 100 connected to the distribution unit 1010, as well as the number of loads 1015, could take any value. A supervision unit 1025 may also be included in the system, supervision unit 1025 being able to communicate with some or all of the components of power system 1000 by means of signalling connections 1030. Supervision unit 1025 could be used for monitoring and controlling the SMPSs 100A-C as well as for monitoring the battery 1005. The supervision unit 1025 could e.g. control active load sharing between SMPSs 100A-C by adjusting the output voltages of the SMPSs 100A-C. Furthermore, the output voltage, $U_{out}$, of SMPSs 100A-C, is preferably adjusted as the temperature of the battery 1005 varies. This could e.g. be done by sending an output voltage reference value to the SMPSs 100A-C.

By interconnecting a plurality of SMPS 100 in a power system 1000, several advantages are achieved, such as e.g. redundancy and a possibility of adapting the size of the power system 1000 to the demands of the applied loads 1015. In a power system 1000 in which the SMPSs 100 are digitally controlled, further advantages are obtained, e.g. in terms of increased flexibility. A number of parameters, such as the measured values of the measured quantities, can easily be sent from the SMPSs 100 to the supervision unit 1025, thus providing important information to the supervision unit 1025. Furthermore, supervision unit 1025 can easily amend parameters determining the operation of the SMPSs 100.

A further advantage achieved by introducing digital control to the SMPSs 100 included in a power supply system 1000 is that the re-start of the SMPSs 100 can be synchronised. In case of short-circuit or over-load conditions, it is often required that output current of the power supply system 1000 is reduced in order to minimise losses and prevent heating of cables. This can e.g. been obtained by continuously reducing $I_{out}$, of the SMPSs 100 to a value well below the maximum output current. However, it can then be difficult to re-start the load when the short circuit or over load is removed, since the reduced current may be too low to supply the load 1015.

Another approach to reducing the output current of the power supply system 1000 could be to turn off the SMPSs 100 completely for a while, and then do re-start. If the short-circuit or overload condition still exists as a re-start attempt is made, the SMPSs are turned off again. In one embodiment of the power supply system, re-start attempts are made every 10 s. in a short-circuit or over-load condition, and, in the case of a still existing short-circuit or overload condition, the SMPSs 100 are turned off again after 1 s. However, these time periods could obviously be as long or as short as the application requires.

When re-starting SMPSs 100 after a short-circuit or over-load condition, it is important that the re-start of all the SMPSs 100 included in power supply system 1000 is synchronised. If the re-starts are not synchronised, there is a big risk that at an arbitrary moment in time, the output current provided by the SMPSs 100 that are turned on is not sufficient to supply the load 1015, and hence, the re-start attempt will not be successful. In many cases, the load 1015 is an electronic load which starts quickly and draws constant power, and hence draws more current as the voltage is low, e.g. upon start-up. It is therefore important that the power supply system 1000 can start quickly and provide full output current directly after start-up. Hence, the re-start of SMPSs 100 should preferably be synchronised.

The synchronisation of the re-start of the SMPSs 100 of power supply system 1000 could advantageously utilise the 50/60 Hz mains frequency (or other mains frequencies). The programmable digital circuit 600 of each SMPS 100 in power supply system 1000 could be provided with measurement values of the mains voltage, $U_{ac}$, or alternatively, measurement values of the input voltage, $U_{in}$, based on which the programmable digital circuits 600 can determine when another mains voltage period, $T_{uac}$, has passed. The difference between the start-up time of the SMPSs will, when using the mains frequency as the basis for synchronisation, in most cases be sufficiently small, even if the SMPSs 100 are on different phases of the mains voltage.

The mains voltage, $U_{ac}$, can vary in a wide range in different mains power supply networks, and the curve shape can be altered depending on the load 1015. Furthermore, there exists a ripple in the mains voltage, $U_{ac}$. Therefore, an efficient way of determining the passing of another mains voltage period, $T_{uac}$, has to be provided. This can be done by checking whether the measurement values of the mains voltage lies within a certain, rather narrow, voltage interval, $I_u$. If so, the next measurement is not taken until a time, $t_{jump}$, has passed, which is sufficiently long for the voltage to have passed that same voltage interval, $I_u$, within the same period, $T_{uac}$, of the mains voltage, but sufficiently short for the next period, $T_{uac}$, to not yet have started. In a mains voltage network operating at 50 Hz and providing 230 V, the voltage interval, $I_u$, could e.g. be the interval between 80 and 90 V, and $t_{jump}$ could e.g. take the value 16 ms. The start-up time of the SMPSs 100 would then not differ by more than 20 ms. In a system comprising SMPSs 100 which comprise a diode bridge 115 on the input, the rectified input voltage, $U_{in}$, could preferably be used for synchronisation of the re-start of the SMPSs 100. The period of $U_{in}$, $T_{uin}$, is only half that of $U_{ac}$. Thus, $t_{jump}$ could be reduced to half, and the start-up time of the SMPSs 100 included in power supply system 1000 would differ even less.

FIG. 11 illustrates a schematic flowchart that could be used for the re-start of each SMPS 100 of power supply system 1000 in case of short circuit or overload. In the example provided in FIG. 11, the frequency of the rectified voltage, $U_{in}$, is used as a reference for synchronisation. In step 1100, it is detected that an over-load or short-circuit condition exists. If this condition last for longer than a certain period of time, which e.g. could be one minute, step 1105 is entered, in which the SMPS 100 is turned off. Step 1110 is then entered, in which a digital timer is set to a certain start value. A measurement of the input voltage, $U_{in}$, is then taken in step 1115. In step 1120, it is then checked whether the measurement of $U_{in}$ lies within the voltage interval, $I_u$. If not, step 1115 is re-entered. However, if the measurement of $U_{in}$ lies within $I_u$, then step 1125 is entered, in which the digital timer is reduced by one. It is then checked, in step 1130, whether the digital timer has a value greater than zero. If not, step 1135 is entered, in which the process enters a waiting state for $t_{jump}$. When $t_{jump}$ has passed, step 1115 is re-entered. However, if in step 1130 it is found that the digital timer is zero, the SMPS 100 is re-started in step 1140. Step 1145 is then entered, in which it is checked whether the overload or short circuit condition still exists. If so, step 1105 is re-entered. If not, normal operation of SMPS 100 is resumed.

The process described in FIG. 11 would preferably be executed by the programmable digital circuit 600 of each SMPS 100 of power supply system 1000. If the process described in FIG. 11 is started at the same time in each SMPS 100 of power supply system 1000, the start-up times of the SMPSs 100 will be very close to each other in time.

One skilled in the art will appreciate that the present invention is not limited to the embodiments disclosed in the accompanying drawings and the foregoing detailed description, which are presented for purposes of illustration only, but it can be implemented in a number of different ways, and it is defined by the following claims.

What is claimed is:

1. A switched power supply comprising:
   input terminals for receiving electric power and output terminals for delivering an output signal having an output voltage and an output current;
   wherein the input terminals are separated from the output terminals by an insulation barrier so that the input terminals are provided on a primary side of the insulation barrier and the output terminals are provided on a secondary side of the insulation barrier;
   a converter stage coupled between the input terminals and the output terminals, the converter stage having at least one controllable first switching element for generating a converter state duty cycle so as to cause the converter stage to generate the output signal; and
   a digital circuit for controlling the switching element in dependence of at least one signal, wherein the digital circuit is located on the primary side of the insulation barrier, and
   the switched mode power supply further comprises an amplifier located on the secondary side and arranged to receive the output voltage on a first amplifier input and produce an amplifier output signal that is to be transferred across the insulation barrier to the digital circuit,
   wherein the digital circuit is a programmable digital circuit comprising a processing means, a working memory, and an at least partly non-volatile memory for storing executable commands,
   and that the amplifier is frequency dependant having a transfer function characteristic that amplifies higher frequency components relative to the lower frequency components.

2. The switched mode power supply of claim 1, wherein the amplifier is arranged to receive an output reference voltage signal from an auxiliary processor on a second amplifier input and that the amplifier output signal is an analogue output error signal.

3. The switched mode power supply of claim 1, wherein the output voltage is the sole input to the amplifier and wherein the output reference voltage signal is generated within the programmable digital circuit.

4. The switched mode power supply of claim 1, wherein the amplifier is frequency dependent having a transfer function characteristic that attenuates lower frequency components and amplifies higher frequency components.

5. The switched mode power supply of claim 1, wherein
   the converter stage can operate in a mode for delivering a substantially constant output power; and
   the converter stage can operate in a mode for delivering a substantially constant output current.

6. The switched mode power supply of claim 1, wherein
   the programmable digital circuit comprises means for receiving a signal representing the input current of the converter stage;
   the programmable digital circuit is adapted to deriving the output current from the signal representing the input current of the converter stage; and
   the programmable digital circuit is further adapted to using the derived value of the output current in the control of the first switching element.

7. The switched mode power supply of claim 1, further comprising a converter stage output controller adapted to control the value of the converter stage duty cycle; the converter stage output controller being at least party embodied by the programmable digital circuit.

8. The switched mode power supply of claim 5, wherein the programmable digital circuit is further adapted to operate the converter stage so as to deliver a substantially constant output current in dependence on the derived value of the output current and information indicative of the converter stage duty cycle.

9. The switched mode power supply of claim 8, wherein the programmable digital circuit is further adapted to enable the operation of the converter stage so as to deliver a substantially constant output current in dependence on the derived output current value and the information is indicative of the converter stage duty cycle when the value of the duty cycle is higher than a predetermined threshold value.

10. The switched mode power supply of claim 8, wherein predetermined threshold value is a value of 0.4 or less.

11. The switched mode power supply of claim 1, wherein the converter stage is a DC/DC converter stage.

12. The switched mode power supply of claim 1, wherein the converter stage comprises four switching elements arranged in a full bridge, the programmable digital circuit being adapted to controlling the four switching elements.

13. The switched mode power supply of claim 12, wherein
   the programmable digital circuit is adapted to generating and sending one pulse width modulated signal to each of the four switching elements; and
   the programmable digital circuit is further adapted to determining a phase shift in two, of the four pulse width modulated signals with respect to the other two of the four pulse width modulated signals, the phase shift being determined based on a desired value of the duty cycle of the full bridge.

14. The switched mode power supply of claim 1, wherein the programmable digital circuit is adapted to use the mains frequency in determining timing of re-start attempts of the switched mode power supply.

15. The switched mode power supply of claim 1, wherein
the programmable digital circuit is adapted to receiving a signal indicative of the mains voltage to which the input terminals of the switched mode power supply are connected; and
the programmable digital circuit is further adapted to using the signal in determining the maximum power delivered by the switched mode power supply.

16. The switched mode power supply of claim 1, wherein the converter stage output controller is adapted to control the value of the converter stage duty cycle so that the converter stage operates in a mode for delivering a substantially constant output voltage.

17. The switched mode power supply of claim 1, wherein at least one optocoupler is used for transmitting at least one signal across the insulating barrier.

18. The switched mode power supply of claim 1, wherein the switched mode power supply comprises:
means for measuring a quantity;
means for generating a reference value of the quantity;
means for generating the difference between the measured value and the reference value of the quantity; and
the programmable digital circuit comprises means for converting the difference between the measured value and the reference value of the quantity into digital representation.

19. The switched mode power supply of claim 18, wherein
the quantity is the output voltage of the switched mode power supply; and
the programmable digital circuit is further adapted to using the difference in the control of the first switching element.

20. A power supply system comprising:
a first switched mode power supply of claim 1, the first switched mode power supply being adapted to deliver a first power output; and
a second switched mode power supply of claim 1; the second switched mode power supply being adapted to deliver a second power output;
and a distribution unit comprising:
a distribution unit input being connected to receive the fist power output and the second power output; and
at least one distribution unit output for supplying electric power to a load.

21. The switched mode power supply of claim 20, wherein
the programmable digital circuit is adapted to receiving a signal indicative of the mains voltage to which the input terminals of the switched mode power supply are connected; and
the programmable digital circuit is further adapted to using the signal in determining the maximum power delivered by the switched mode power supply.

22. The switched mode power supply of claim 1, wherein the programmable digital circuit is further arranged to apply a reverse transfer function on the amplifier output signal to retrieve a digital representation of the output voltage.

* * * * *